US009122055B2

(12) United States Patent (10) Patent No.: US 9,122,055 B2
Aizenberg et al. (45) Date of Patent: Sep. 1, 2015

(54) ADAPTIVE SHADING, DISPLAY AND COLOR CONTROL

(75) Inventors: Joanna Aizenberg, Boston, MA (US); Philseok Kim, Arlington, MA (US); Jack Alvarenga, Quincy, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 316 days.

(21) Appl. No.: 13/702,933

(22) PCT Filed: Jun. 10, 2011

(86) PCT No.: PCT/US2011/039980
§ 371 (c)(1),
(2), (4) Date: May 17, 2013

(87) PCT Pub. No.: WO2012/039797
PCT Pub. Date: Mar. 29, 2012

(65) Prior Publication Data
US 2013/0222881 A1 Aug. 29, 2013

Related U.S. Application Data

(60) Provisional application No. 61/353,505, filed on Jun. 10, 2010.

(51) Int. Cl.
*G02B 26/02* (2006.01)
*B29D 11/00* (2006.01)
*E06B 9/24* (2006.01)
*G02F 1/01* (2006.01)

(52) U.S. Cl.
CPC ............ *G02B 26/02* (2013.01); *B29D 11/0074* (2013.01); *E06B 9/24* (2013.01); *G02F 1/0131* (2013.01)

(58) Field of Classification Search
CPC .................................. G02B 26/02; G02B 5/18
USPC .......................................................... 359/291
See application file for complete search history.

(56) References Cited

U.S. PATENT DOCUMENTS

2009/0296188 A1    12/2009  Jain et al.
2009/0297776 A1 *  12/2009  Crosby et al. ................. 428/152

FOREIGN PATENT DOCUMENTS

WO    WO-2008/140488 A2    11/2008

OTHER PUBLICATIONS

Yu et al. "Tunable optical gratings based on buckled nanoscale thin films on transparent elastomeric substrates," Jan. 29, 2010, Applied Physics Letters vol. 96, pp. 041111-1-041111-3).*

(Continued)

*Primary Examiner* — Scott J Sugarman
*Assistant Examiner* — Ephrem Mebrahtu
(74) *Attorney, Agent, or Firm* — Wilmer Cutler Pickering Hale and Dorr LLP

(57) ABSTRACT

A substrate having a second material on a surface of the substrate or embedded as a layer within the substrate are described. The second material has a different index of refraction and/or stiffness than the substrate so that stretching and unstretching of the substrate and the second material can induce wrinkles in the second material that interacts with light thereby allowing reversible change from a transparent state to an opaque or iridescent state, and vice versa. The present disclosure is useful as a shading system and/or displays.

35 Claims, 28 Drawing Sheets

(56) References Cited

OTHER PUBLICATIONS

Harrison et al. "Sinusoidal phase grating created by a tunably buckled surface," Nov. 1, 2004, Applied Physcis Letters vol. 85, pp. 4016-4018.*

International Search Report and Written Opinion for International Application No. PCT/US2011/039980 mailed on Apr. 4, 2012 (10 pages).

Efimenko, K. et al., "Nested self-similar wrinkling patterns in skins," Nature Materials, vol. 4, pp. 293-297 (Apr. 2005).

Huck, W.T.S. et al., "Ordering of Spontaneously Formed Buckles on Planar Surfaces," Langmuir, vol. 16, pp. 3497-3501 (2000).

Huck, Wilhelm T., "Artificial Skins: Hierarchical wrinkling," Nature Materials, vol. 4, pp. 271-272, (Apr. 2005).

Jiang, X. et al., "Controlling Mammalian Cell Spreading and Cytoskeletal Arrangement with Conveniently Fabricated Continuous Wavy Features on Poly(dimethylsiloxane)," Langmuir, vol. 18, pp. 3273-3280 (2002).

Schweikart, A. et al., "Controlled wrinkling as a novel method for the fabrication of patterned surfaces," Microchimica Acta: An international Journal on Micro and Trace Analysis, vol. 165, No. 3-4, pp. 249-263 (Apr. 7, 2009).

Stafford, C.M. et al., "A buckling-based metrology for measuring the elastic moduli of polymeric thin films," Nature Materials, vol. 3, pp. 545-550 (Aug. 2004).

* cited by examiner

Opaque: 0% applied strain

Transparent: 20% applied strain

ADAPTIVE SHADING, DISPLAY AND COLOR CONTROL

CROSS-REFERENCE TO RELATED APPLICATIONS

This application is a national stage application of International Application No.: PCT/US2011/039980, filed on Jun. 10, 2011, which claims the benefit of the earlier filing date of U.S. Patent Application No. 61/353,505, filing date Jun. 10, 2010, the contents of which is incorporated by reference herein in its entirety.

STATEMENT REGARDING FEDERALLY SPONSORED RESEARCH OR DEVELOPMENT

This invention was made in part with Government support under Department of the Air Force award FA9550-09-1-0669 DOD35CAP. The Government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present disclosure relates to elastomeric material based adaptive shading, display and color control. More particularly, the present disclosure relates to adaptive shading and display systems that can adaptively adjust the transparency.

BACKGROUND

Various forms of shading systems that control the transmission of light exist. They include conventional window treatments, such as curtain, draperies, blinds, louvers, and the like. These have the disadvantage that there is always some non-transparent foreign object near the windows that must be moved out of the way to allow light to transmit through.

To address this deficiency, "smart windows" have been developed, such as photochromic windows, thermotropic windows, thermochromic windows, polymer dispersed liquid crystal windows, suspended particle system windows, electrochromic windows, and gasochromic windows. A review of these types of windows are found in Background of the Invention section of United States Publication No. 2009/0296188. Although these smart windows provide certain improvements over conventional window treatment, they are extremely costly and/or difficult to fabricate or replace.

Various forms of displays that provides desired messages exist. They include static displays that cannot change once a message is imprinted, dynamic displays based on holography, dynamic displays that require electrical power (e.g., computer screens), and the like. However, such displays are limited (e.g., static) or expensive to operate and/or manufacture (e.g., holography and/or computer screens).

SUMMARY OF THE INVENTION

In accordance with the present disclosure, a shading system that includes a substrate; a second material having a different index of refraction than the substrate on or embedded within a region of the substrate and forming a plurality of wrinkles; and a stretching device to reversibly stretch the substrate and the second material and to reduce the applied elongation is disclosed. In certain embodiments, the stretching device is capable of controlling the amount of light transmission by altering the orientation of the wrinkles as a function of applied strain. Moreover, the shading system is transparent when some of the wrinkles are oriented substantially parallel to the stretching direction and some of the wrinkles are oriented substantially perpendicular to the applied strain direction.

In accordance with the present disclosure, a method for fabricating the shading system of the present disclosure is described. The method includes providing a substrate; forming a second material on or embedded within a region of the substrate and forming a plurality of wrinkles, wherein the second material has a different index of refraction than the substrate; and operably providing the substrate and the second material to a stretching device to form a shading system so that the stretching device is capable of stretching the shading system and the stretching device is capable of reducing the applied strain, and the stretching device is capable of controlling the amount of light transmission altering the orientation of the wrinkles as a function of applied strain. In certain embodiments, the shading system is transparent when some of the wrinkles are oriented substantially parallel to the stretching direction and some of the wrinkles are oriented substantially perpendicular to the applied strain direction.

In accordance with the present disclosure, a display is disclosed. The display can include a substrate; and a first region on or embedded within the substrate that comprises a second material having a different index of refraction than the substrate and forming a plurality of wrinkles. In certain embodiments, the display is capable of controlling the amount of light transmission through the first region to exhibit a desired message by altering the orientation of the plurality of wrinkles as a function of applied strain. Moreover, the first region of the display is transparent when some of the wrinkles are oriented substantially parallel to the stretching direction and some of the wrinkles are oriented substantially perpendicular to the applied strain direction.

In accordance with the present disclosure, a method for fabricating the display of the present disclosure is described. The method includes providing a substrate; and forming a first region on or embedded within the substrate that comprises a second material having a different index of refraction or stiffness than the substrate and having a plurality of wrinkles to form a display. In certain embodiments, the display is capable of controlling the amount of light transmission through the first region to exhibit a desired message by altering the orientation of the plurality of wrinkles as a function of applied strain. Moreover, the first region of the display is transparent when some of the wrinkles are oriented substantially parallel to the stretching direction and some of the wrinkles are oriented substantially perpendicular to the applied strain direction.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

An apparatus, such as a shading system or a display sign, that can reversibly switch between a transparent state to a less transparent state, such as opaque, colored, iridescent, scattering, diffracting, and the like, is described. In a first state, the apparatus can be transparent and in a second state, the apparatus can become less transparent when positive or negative strain is applied. In some other embodiments, the apparatus can be less transparent in the first state but become more transparent upon application of the strain. In certain embodiments, the apparatus can be less transparent in the first state, become transparent in a second state upon application of strain, then become less transparent again in the third state upon even further application of strain. Regardless, the mechano-responsive apparatus of the present disclosure can reversibly switch between the at least two different transparency states upon application or removal of strain.

Figure 1:
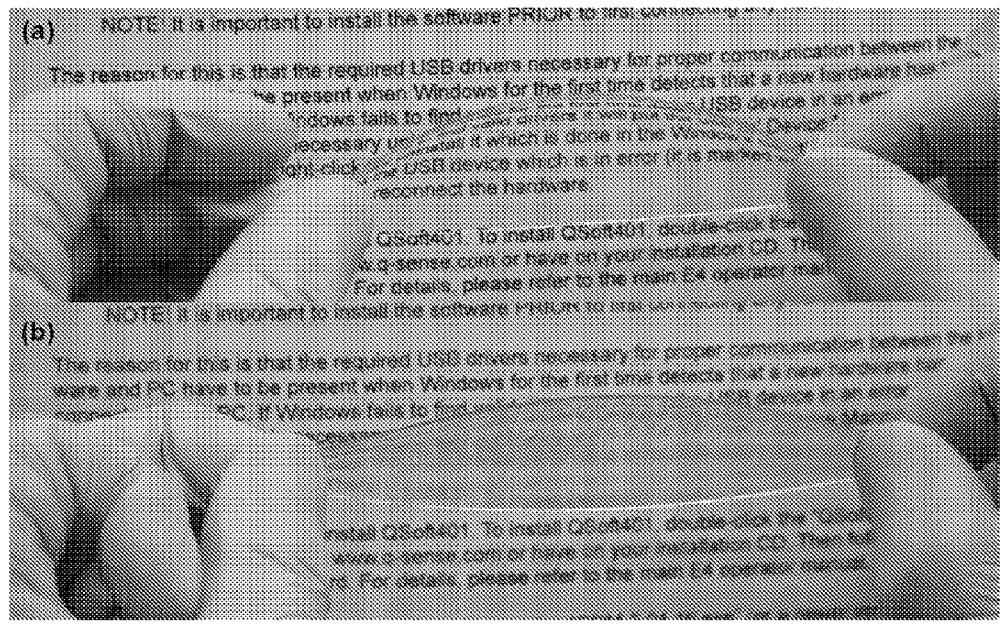
FIGS. 1A through 1D are photographs of a PDMS (polydimethylsiloxane) sheet having a silica-like structure on a surface thereon that is stretched (FIGS. 1B and 1D) and released (FIGS. 1A and 1C) to allow reversible transition between a transparent and an opaque/colored state in accordance with certain embodiments.
Figure 1C:
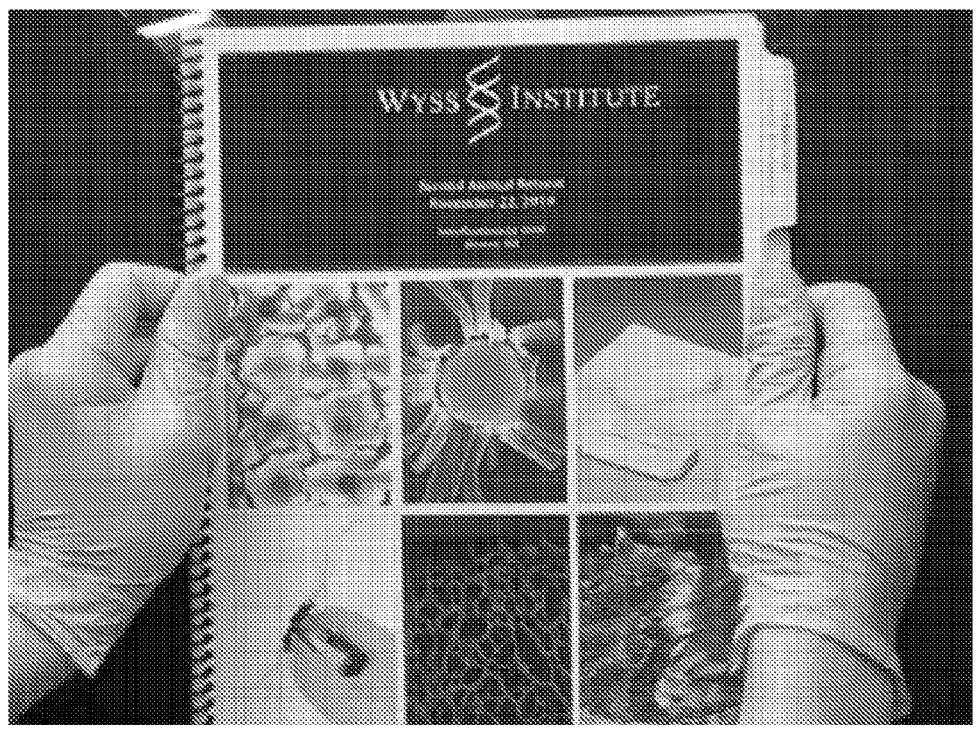
Figure 1D:

With reference to FIG. 1, an apparatus that can reversibly switch between a transparent state to a less transparent state (e.g., opaque and/or iridescent), with the application or removal of strain is illustrated. As shown in FIGS. 1A and 1C, the text which is below the apparatus is clearly visible. When the apparatus is stretched, the text which is below the apparatus becomes obscured as shown in FIGS. 1B and 1D. When the applied strain is removed, the apparatus returns to the transparent state shown in FIGS. 1A and 1D.

As illustrated, the apparatus can adaptively adjust the transparency and/or the iridescence in response to environmental changes. Such an apparatus may allow sustainable performance of smart buildings that meet globally growing challenges, such as energy, climate change, and human interface. Such an apparatus can be utilized to construct smart displays that show certain text by reducing the amount of transmitted light in desired patterned regions at a given applied strain.

The apparatus of the present disclosure can be made using a compliant substrate material such as an elastomeric material having a region of a second material on a surface of or embedded within the elastomeric material, where the second material has a different index of refraction, thermal expansion coefficient, and/or mechanical properties than the elastomeric material. The apparatus can further include a suitable stretching device to apply or remove strain that allows the reversible switching between the transparent and less transparent state.

Substrate Material

The substrate material can be any suitable material that allows reversible deformation without plastic deformation or fracture occurring within acceptable ranges of elongation or strain, such as an elastomeric material. In certain embodiments, the substrate material may be transparent to visible wavelengths. In certain embodiments, the substrate material may be transparent to infrared wavelengths. In certain embodiments, the substrate material may be transparent to ultraviolet wavelengths. Some exemplary elastomeric materials include polydimethylsiloxane (PDMS), urethane rubbers, polysulfide rubbers, thermoplastic elastomers, polyolefin elastomers, ethylene vinyl acetate, and the like. The acceptable range of strain that can be imparted to alter the transparency while not losing the reversible deformation characteristics of the elastomeric material include elongation that range anywhere from 1% to 1000%, such as greater than about 1%, 5%, 10%, 20%, 30%, 50% 100%, or 500% elongation. For example, up to 100% elongation is possible for Dow Sylgard 184 and up to 1000% elongation is possible for PMC polyurethanes and Ecoflex silicones.

In certain embodiments, the substrate material may be provided as a composite material with dyes, pigments, thermochromic particles, fluorescent molecules, or fillers of the like to provide desired colors, fluorescence, texture, and modified mechanical properties. Suitable dyes can include Solvent blue 35, Solvent red 23, and the like. Suitable fluorescent materials can include rhodamine, fluorescein, brilliant green, Nile red, and the like. Suitable filler materials can include, silica, titania, barium titanate, magnetic particles, and the like.

Second Material

The second material can have different optical properties relative to the substrate material, such as a different refractive index, a different absorption properties, different color, and the like. The second material can also have different mechanical properties relative to the substrate material, such as a different modulus, different elasticity, different plasticity, different fracture stress or fracture strain, different stiffness, and the like. The second material can also have different thermal expansion coefficient to induce different degrees of stretching (and therefore transparency) upon temperature changes.

Figure 2A:
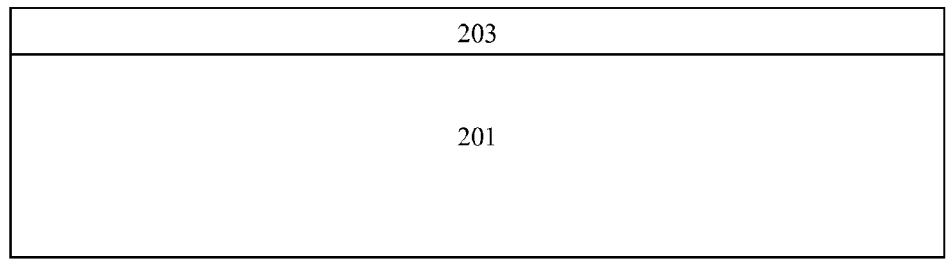
FIGS. 2A through 2C show schematic diagrams of a second material formed on the surface or embedded within an elastomeric material in accordance with certain embodiments.
Figure 2B:
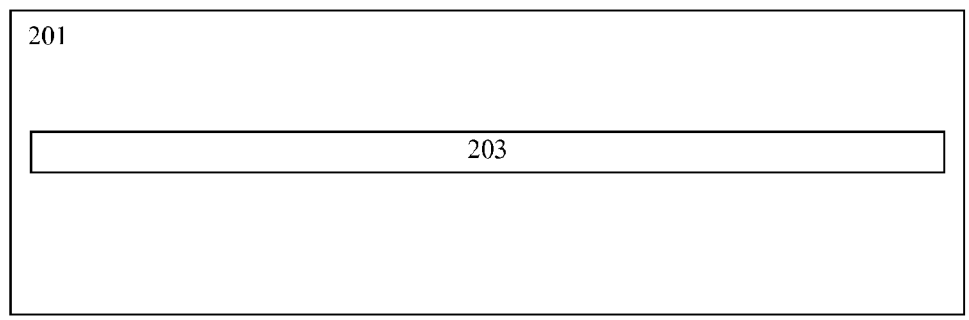
Figure 2C:
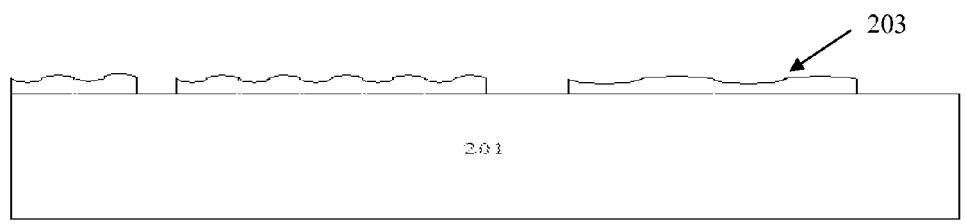

FIGS. 2A-2C show some exemplary configuration of the second material provided on or within the substrate material. For example, FIG. 2A shows a layer of second material 203 over the substrate material 201. FIG. 2B shows a layer of second material 203 embedded within the substrate material 201. FIG. 2C shows a layer of second material 203 having surface features provided over the substrate material 201.

In certain embodiments, as shown in FIG. 2C, the second material can be patterned onto or into certain desired regions of the substrate material. For example, the second material can be patterned onto the substrate material to render only a region opaque or iridescent upon application of strain while the unpatterned regions remain transparent.

Figure 3A:
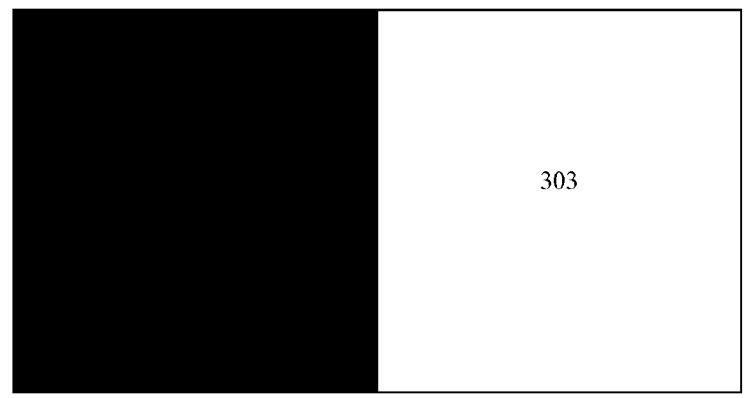
FIGS. 3A and 3B show a first region changing from opaque to transparent and a second region changing from transparent to opaque as a function of applied strain in accordance with certain embodiments.
Figure 3A:
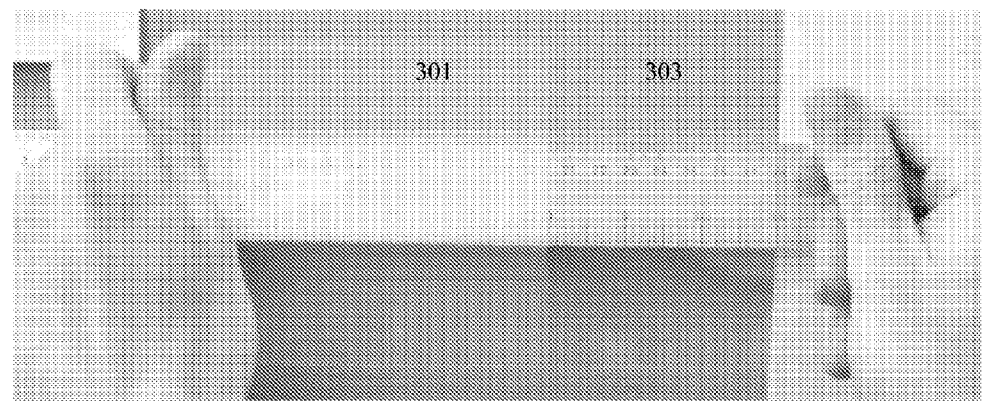
Figure 3B:
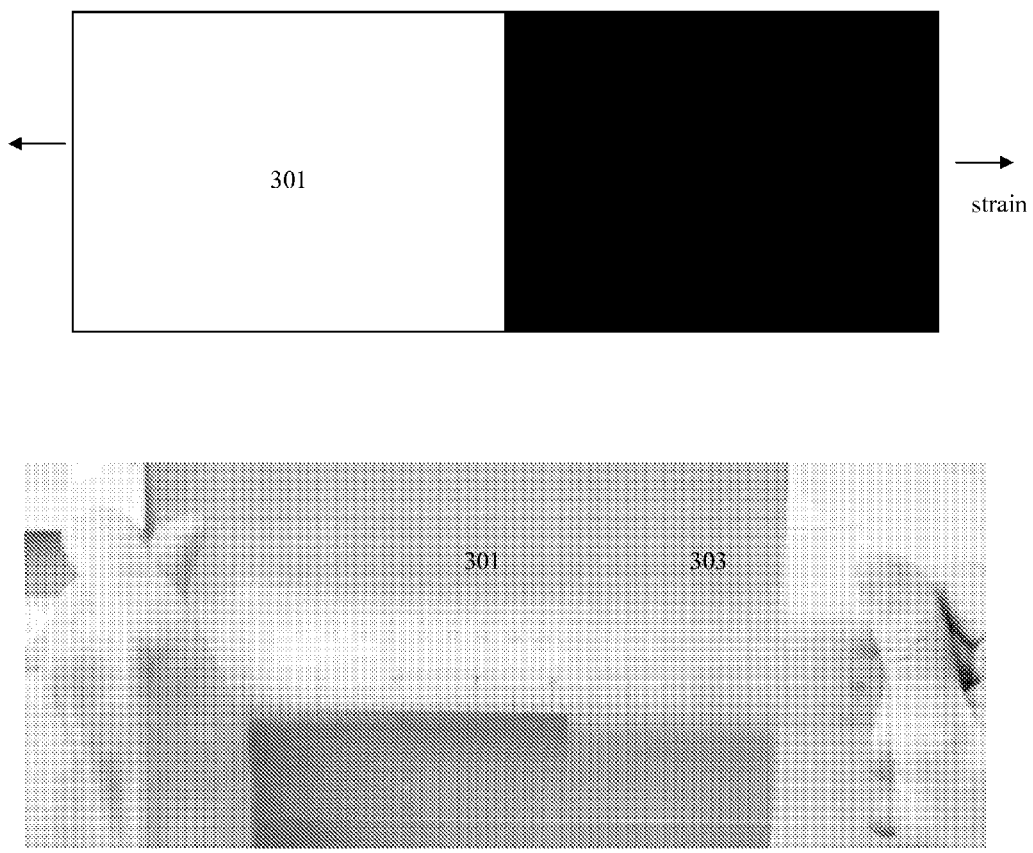

In certain embodiments, as shown in FIG. 3A, the second material can be patterned onto or into the substrate material so that a first patterned region 301 is initially opaque or iridescent while a second patterned region is initially transparent 303. As shown in FIG. 3B, upon application of strain, the first patterned region 301 may become transparent while the second patterned region becomes opaque or iridescent 303.

In certain embodiments, the second material can be patterned onto or into the substrate material so that a first patterned region is initially transparent while a second patterned region is initially opaque or iridescent. Upon application of strain, the first patterned region may become opaque or iridescent while the second patterned region becomes transparent.

Figure 4A:
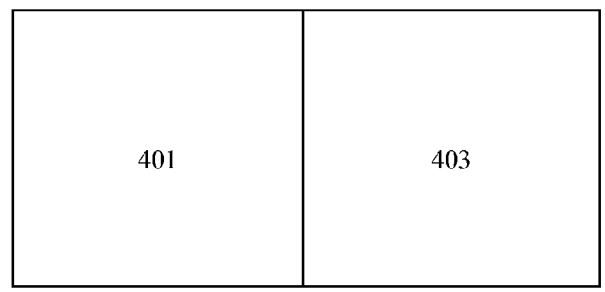
FIGS. 4A through 4C show a first region changing from transparent to opaque to transparent and a second region changing from transparent to transparent to opaque as a function of applied strain in accordance with certain embodiments.
Figure 4B:
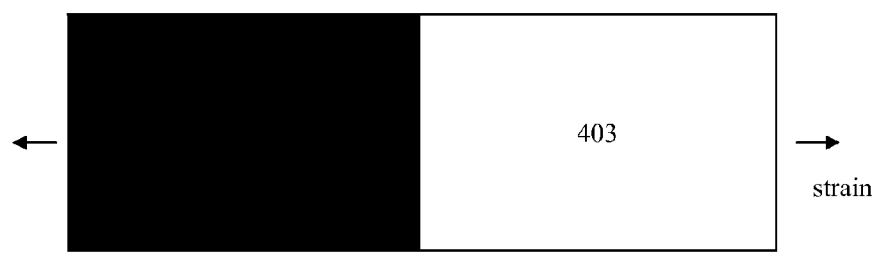
Figure 4C:
Figure 4D:
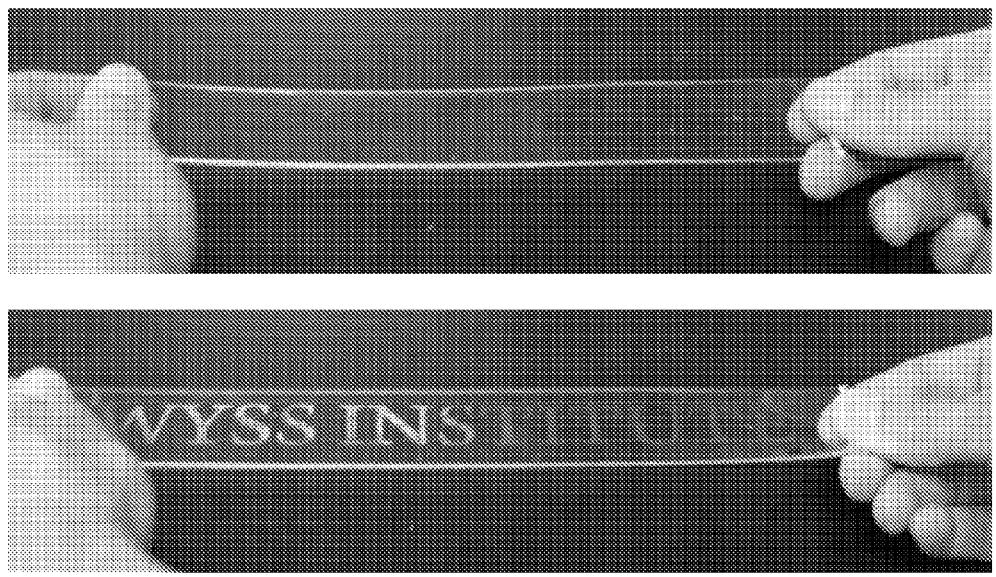
FIG. 4D shows an initially transparent film changing to a film containing opaque regions that display "WYSS INSTITUTE" as a function of applied strain in accordance with certain embodiments.

In certain embodiments, as shown in FIG. 4A, the second material can be patterned onto or into the substrate material so that both a first patterned region 401 and second patterned region 403 are initially transparent. As shown in FIG. 4B, upon application of strain, the first patterned region 401 may become opaque or iridescent while the second patterned region 403 remains transparent. Then, as shown in FIG. 4C, upon further application of strain, the first patterned region 401 may again become transparent while the second patterned region 403 becomes opaque or iridescent.

Figure 5A:
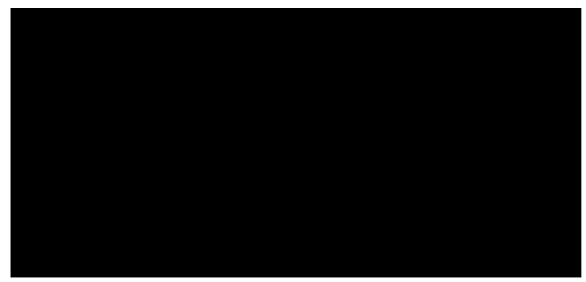
FIGS. 5A through 5C show a first region changing from opaque to transparent to opaque and a second region changing from opaque to opaque to transparent as a function of applied strain in accordance with certain embodiments.
Figure 5B:
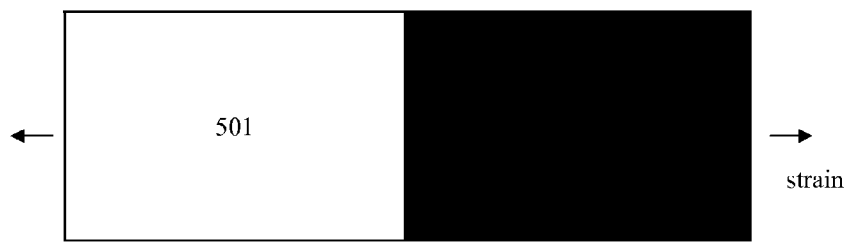
Figure 5C:

In certain embodiments, as shown in FIG. 5A, the second material can be patterned onto or into the substrate material so that both a first patterned region 501 and second patterned region 503 are initially opaque or iridescent. As shown in FIG. 5B, upon application of strain, the first patterned region 501 may become transparent while the second patterned region 503 remains opaque or iridescent. Then, as shown in FIG. 5C, upon further application of strain, the first patterned region 501 may again become opaque or iridescent while the second patterned region 503 becomes transparent.

In certain embodiments, the second material can be patterned onto or into the substrate material with a plurality of different patterned regions. Each of the plurality of different patterned regions may be initially transparent or opaque or iridescent, where upon application of strain, each of the different patterned regions may transition from the initially transparent or opaque or iridescent state to an opaque or iridescent or transparent state at certain applied strain. Numerous different embodiments and modifications to the above-describes embodiments will be within the scope of one of ordinary skill in the art.

Figure 6A:
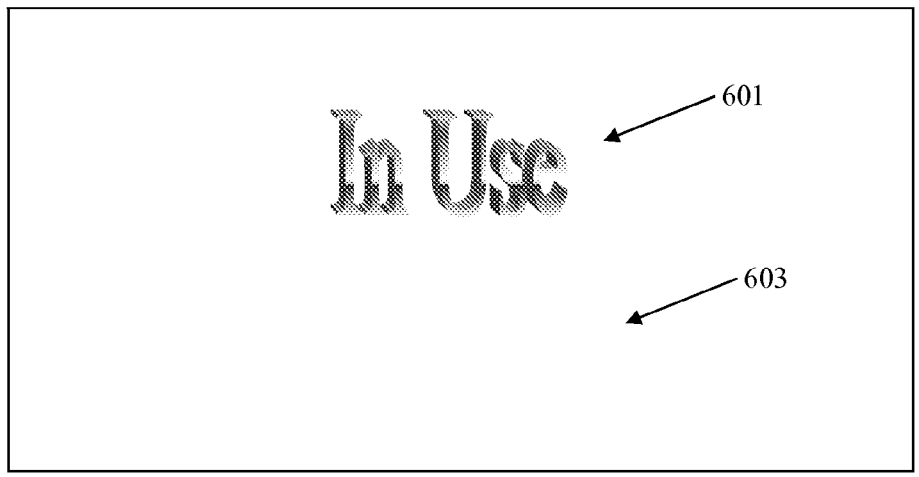
FIGS. 6A and 6B show a first region delineated as "In Use" changing from opaque to transparent and a second region delineated as "Available" changing from transparent to opaque as a function of applied strain in accordance with certain embodiments.
Figure 6B:
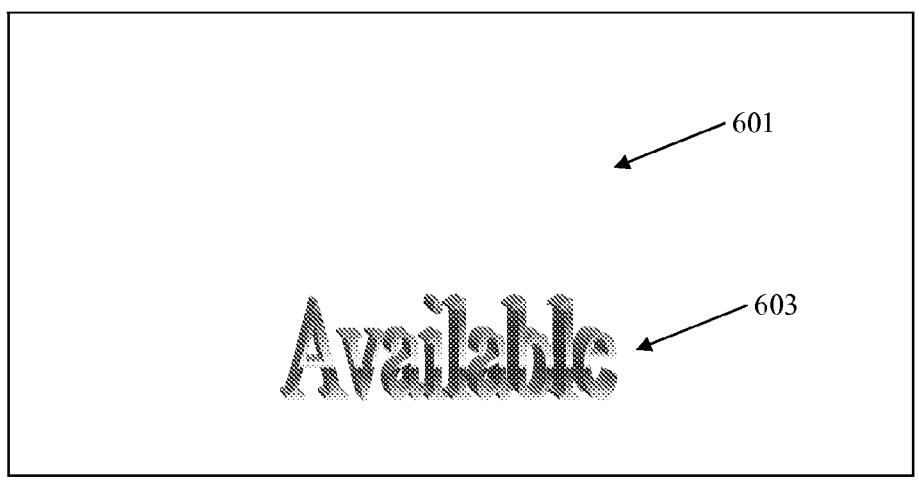

In certain embodiments, the patterned regions may form a text or pictures displaying a certain message when it is in an opaque state. As a result, depending on the applied strain, different desired messages may be displayed. For example, as shown in FIG. 6A, at an initial applied strain, a message "In Use" 601 may be displayed by the opaque or iridescent regions. Then, as shown in FIG. 6B, at a second applied strain (or zero strain), a second message "Available" 603 may be displayed by the opaque or iridescent regions.

Figure 6C:
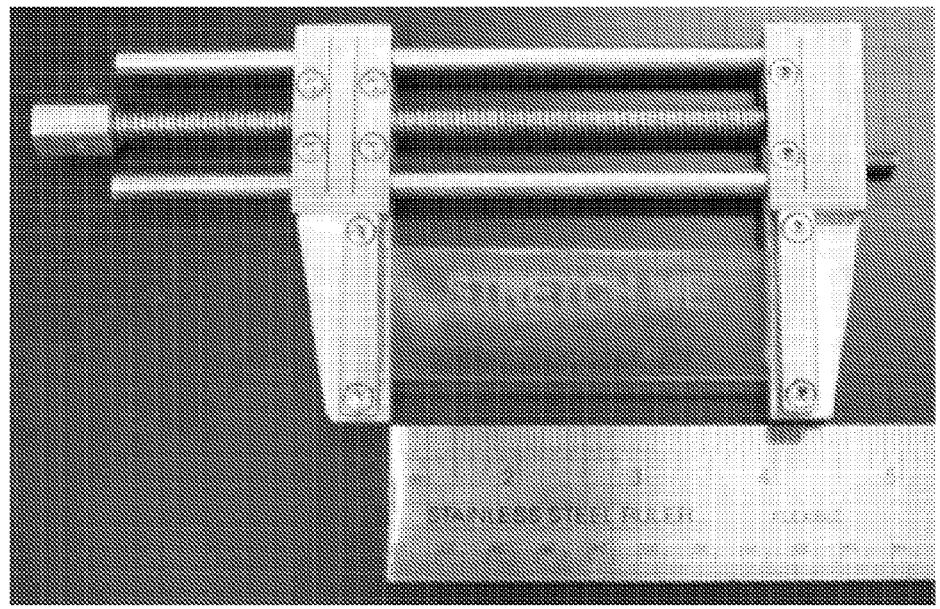
FIGS. 6C and 6D show a first region delineated as "STRETCH ME" changing from opaque to transparent and a second region delineated as "HARVARD" changing from transparent to opaque as a function of applied strain in accordance with certain embodiments.
Figure 6D:
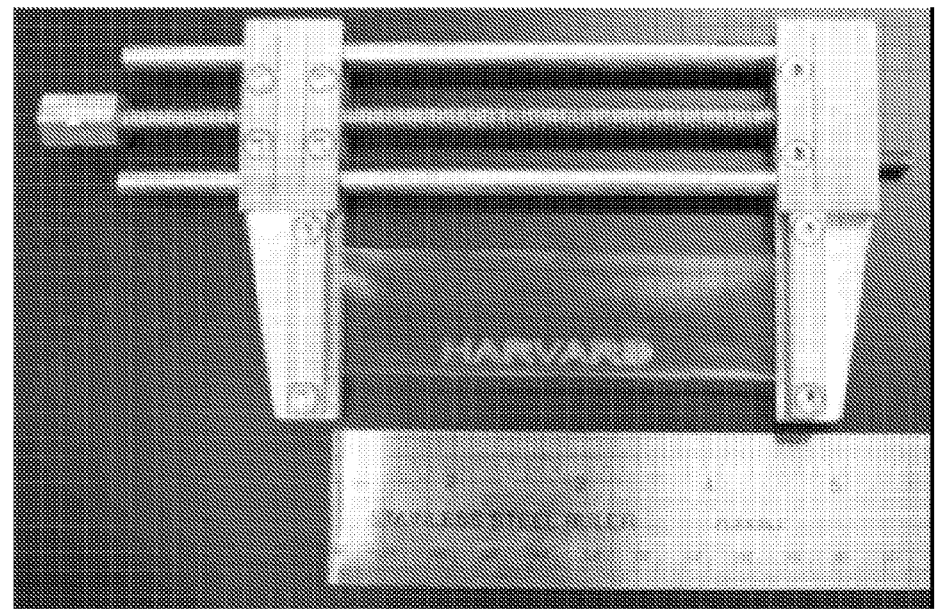

FIGS. 6C and 6D show another example where FIG. 6C, at an initial applied strain (or zero strain), a message "STRETCH ME" is displayed by the opaque or iridescent region. Then, as shown in FIG. 6D, at a second applied strain, a second message "HARVARD" is displayed by the opaque or iridescent region.

In some embodiments, the second material can be embodied as a thin layer having a thickness that ranges from several nanometers to several micrometers. In certain embodiments, the second material can include a plurality of structures, such as hills, valleys, wrinkles, and the like. These structures may be periodic, random, or quasi-periodic. The structures may have lateral dimensions, which can depend on the oxidation time, thickness of the second material formed, and strain removal rate that range from 50 nanometers to 40 micrometers and vertical dimensions, which can depend on mechanical strain or temperature, that can range from about 20-3000 nanometers.

In certain embodiments, the second material can be formed (e.g., by converting some fraction of the surface of the original substrate material) using any suitable technique, such as physical and/or chemical vapor deposition, atomic layer deposition, surface sol-gel process, thermal oxidation, chemical oxidation, UV-ozone treatment, plasma treatment, corona discharge, solution deposition, and the like. Depending on the technique utilized, the resulting structure of the second material may be different.

In certain embodiments, the second material can be formed on or in a substrate material that is not subject to any strain.

In other embodiments, the second material can be formed on or in a substrate material by first applying a predetermined strain, and then carrying out suitable techniques to form a second material at desired regions.

In some other embodiments, the second material can be formed on or in a substrate material by first applying a predetermined strain, carrying out a suitable technique to form a second material at a first patterned region, applying a second predetermined strain, carrying out suitable technique to form a second material at a second patterned region, and the like.

Figure 7:
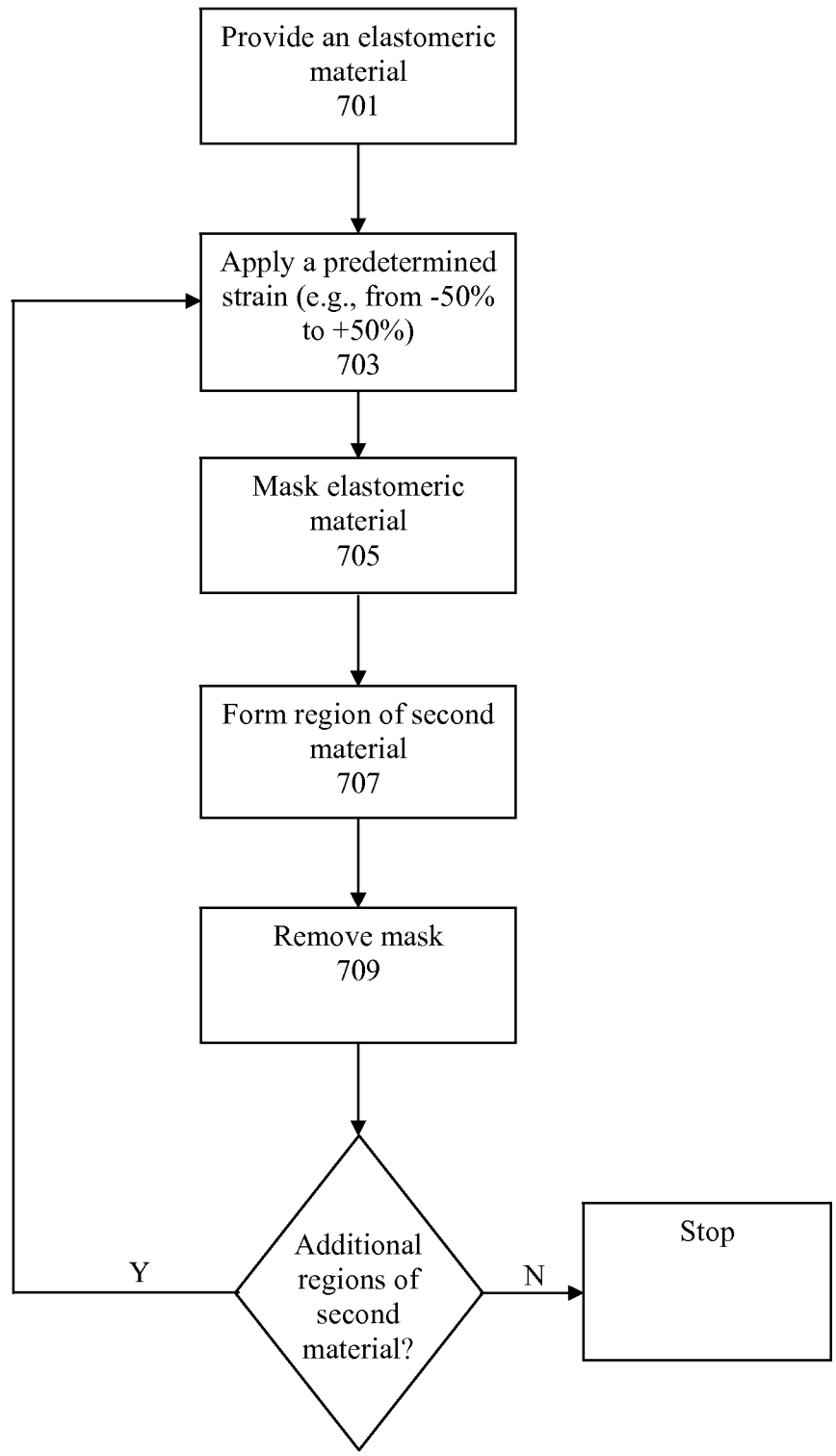
FIG. 7 shows an exemplary method of forming one or more regions of a second material over an elastomeric material in accordance with certain embodiments.

FIG. 7 shows an exemplary method of fabricating one or more regions of the second material. At 701, a substrate material, such as an elastomeric material, is provided. At 703, a first predetermined strain is provided (e.g., zero or finite amount). At 705, the elastomeric material is masked to expose a desired first region. At 707, a suitable technique (e.g., UV-ozone, plasma treatment, etc.) is carried out to form a first region of a second material. At 709, the mask is removed. Thereafter, if additional regions of the second material is desired, 703, 705, 707, and 709 can be repeated with different predetermined strains and desired second regions to form additional regions of the second material.

Numerous different embodiments and modifications to the above-described embodiments will be within the scope of one of ordinary skill in the art.

Optimization of Transparency and Opacity or Iridescence

It should be noted that while the presence of a plurality of structures may provide some opacity or iridescence, there is an optimum window of features sizes where the transmission and opacity or iridescence due to such plurality of structures are optimized. For example, depending on the processing conditions, material combination, applied strain, and the like, the structure may remain transparent despite the formation of a plurality of structures, such as hills, valleys, wrinkles, and the like upon application of strain. However, by careful selection of processing conditions and materials combination, apparatus having sufficiently high opacity or iridescence upon application of strain can be formulated, as discussed herein in greater detail.

For example, maximum transmission may depend on the amount of predetermined strain that is applied before the second material is formed on or in the substrate material. Usually, when the second is formed using a predetermined elongational strain, the apparatus generally exhibits low transparency when there is no applied strain after the second material has been formed. To increase transmittance, the apparatus can be stretched back to the predetermined strain value. Moreover, transmittance usually decreases again when the applied strain exceeds the predetermined strain. However, for a given substrate and second material combination, the actual transmittance for apparatuses formed at a first predetermined strain (e.g., 20%) as opposed to a second predetermined strain (e.g., 30%) can exhibit higher transmittance, when the applied strain is near the respective pre-stretched strain (e.g., 20% and 30%, respectively). In other words, an apparatus where the second material was formed at 20% predetermined elongational strain can exhibit a transmittance of 100% when the applied strain during operation is at 20%. However, an apparatus where the second material was formed at 20% predetermined elongational strain can exhibit a transmittance of 80% when the applied strain during operation is at 30%.

As another example, when forming the second material on the substrate material by oxidation of the substrate, treatment for an extended period of time can hinder region transparency, whereas treatment for an insufficient short period of time can produce regions that fail to show responsive opacity. Likewise, treatment at low power can fail to show an optical response under mechanical stress whereas treatment at high power can prevent region transparency. Hence, there is an optimal oxygen plasma treatment time that can be varied depending on the power output of the equipment. For example, oxygen plasma treatment for PDMS can be carried out for about, for example, 20 seconds to 5 minutes and/or at about 100 Watts to 1 kW.

It is an object of the present disclosure to identify processing conditions that maximize transparency and maximize opacity or iridescence. It is an object of the present disclosure to identify processing conditions that provide the largest contrast between transmittance and opacity or iridescence.

The type and thickness of the second material may also provide an optimal contrast between transmittance and opacity or iridescence. For example, the thickness of the second material may be adjusted so that the wrinkle features that form are optimized to exhibit maximum transmission and opacity or iridescence for the desired range of wavelengths (e.g., visible wavelengths, infrared wavelengths, ultraviolet wavelengths, and the like). As another example, the substrate material and the second material can be selected so that minimal absorption and/or scattering occurs at the applied strain conditions that provide the highest transmittance. Similarly, the substrate material and the second material can be selected so that maximum absorption and/or scattering occurs at the applied strain conditions that provide the highest opacity or iridescence.

It is an object of the present disclosure to identify material combinations that maximize transparency and maximize opacity or iridescence. It is an object of the present disclosure to identify material combinations that provide the largest contrast between transmittance and opacity or iridescence.

It is an object of the present disclosure to identify processing conditions and material combinations that maximize transparency and maximize opacity or iridescence. It is an object of the present disclosure to identify processing conditions and material combinations that provide the largest contrast between transmittance and opacity or iridescence.

In certain embodiments, the second material can be provided under the optimized materials combination and processing conditions as described above so that upon application or removal of strain, more than about 80%, 85%, 90%, or even 95% transmittance (for normal incidence) is achieved at the applied strain exhibiting the maximum transmittance for the particular apparatus. In certain embodiments, the second material can be provided under the optimized materials combination and processing conditions as described above so that upon application or removal of strain, less than 20% 15%, 10%, or even 5% transmittance (for normal incidence) is achieved at the applied strain exhibiting the maximum opacity or iridescence.

Figure 8A:
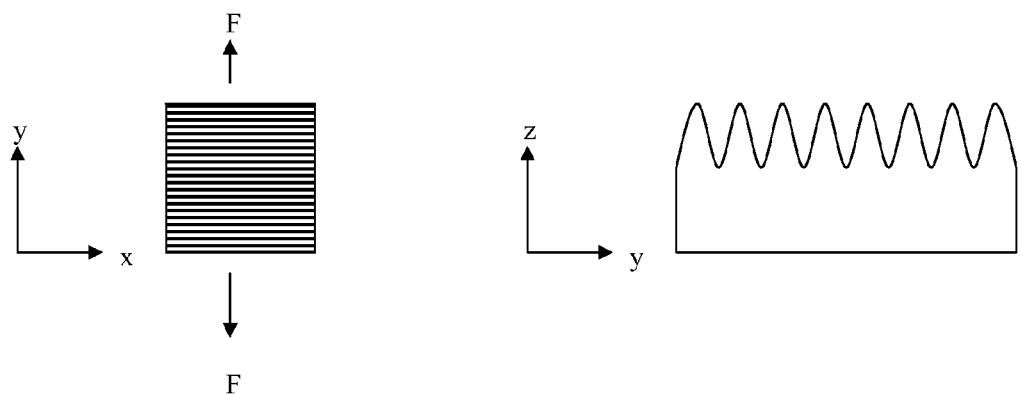
FIGS. 8A through 8C show exemplary microstructures of the wrinkles formed by the second material as the material transitions from opaque to transparent to opaque as a function of applied strain in accordance with certain embodiments.
Figure 8B:
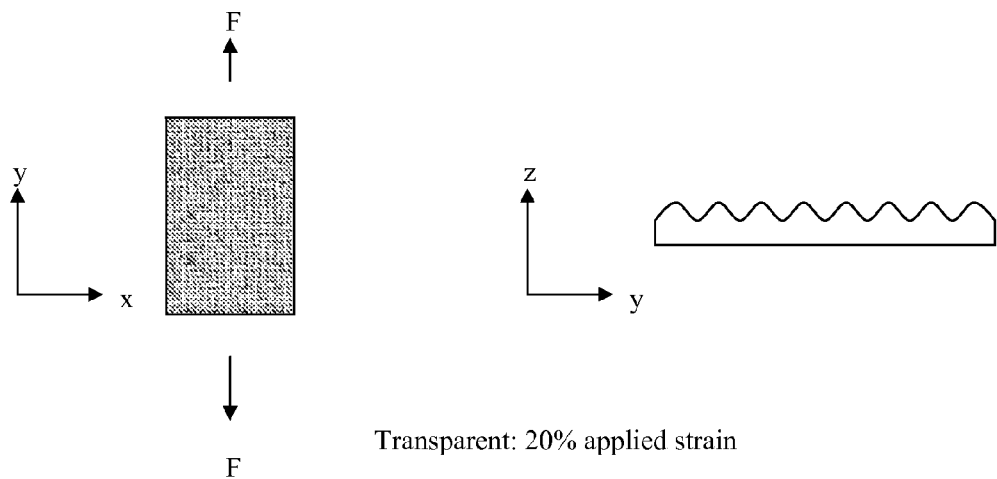
Figure 8C:
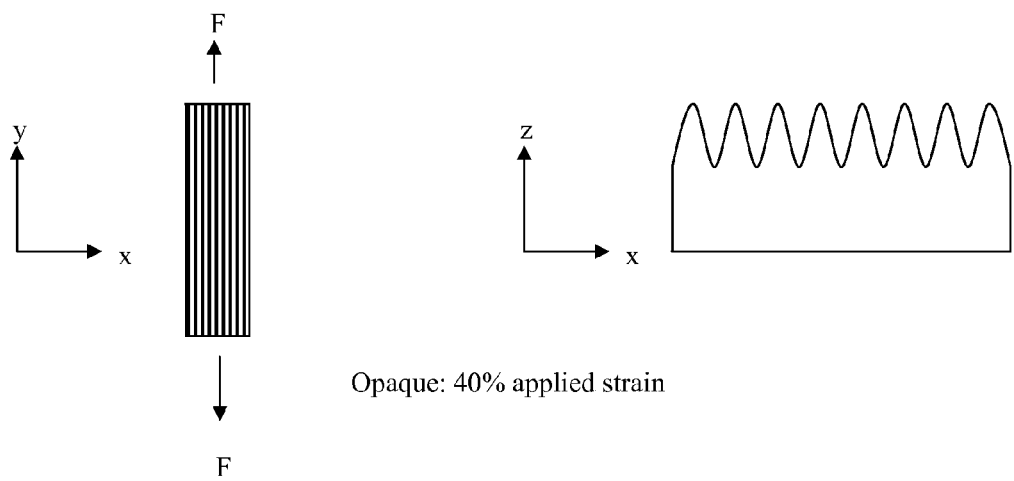

In certain embodiments, the orientation of the wrinkles formed in the second material is dynamically and reversibly switched under uniaxial stretching conditions when the amount of applied stretching changes across the initial pre-strain value used for the formation of the second material. The wrinkles may be oriented in substantially one direction when the apparatus is opaque or iridescent. Moreover, the amplitude of the wrinkles may be substantially high to promote interaction with the incident wavelengths to promote further scattering of the incident light. However, the wrinkles may be oriented substantially in at least two directions when the apparatus is transparent. Moreover, the amplitude of the wrinkles may be substantially shallow to reduce interaction with the incident wavelengths and thus to reduce scattering of the incident light. For example, when the apparatus is opaque at 0% applied strain, transparent at 20% strain, and opaque at 40% strain, FIGS. 8A through 8C schematically show the wrinkles' orientation and amplitude. Notably, without wishing to be bound by theory, the present disclosure provides a new means for obtaining transparent materials, where the microstructures formed by the wrinkles of the second material are at orientations and amplitudes that effectively cancel or minimize interaction with the incident wavelengths of light to allow the light to pass through the materials.

In certain embodiments, the wrinkles can initially be oriented perpendicular to the axis of stretching. Upon stretching, the amplitudes of the wrinkles can gradually decrease while the pitches of the wrinkles gradually increase. When the strain is increased close to the initial pre-strain value, the wrinkles may be oriented along both perpendicular and parallel to the axis of stretching. Upon further stretching (i.e. overstretching), the wrinkles perpendicular to the stretching axis can disappear and the wrinkles can become predominantly parallel to the stretching axis. Without wishing to be bound by theory, these new wrinkles that are parallel to the stretching axis may be caused by the effective compression of the compliant substrate perpendicular to the axis of stretching due to the large Poisson's ratio of the material. Further overstretching may cause these new wrinkles parallel to the stretching axis to have increased amplitudes and decreased pitches. The switching of the orientation of the wrinkles may be reversible and the original wrinkles can be restored when the strain is decreased below the initial pre-strain value.

In certain embodiments, when the second material is formed with zero pre-strain, the material may have a high transmittance. Although wrinkles that are oriented perpendicular to the stretching axis may form due to the natural expansion of the substrate that may occur while the second material is being formed, the amplitude of the wrinkles may be sufficiently low so that incident light transmitted. Upon stretching, wrinkles that are oriented parallel to the stretching axis can form and their amplitudes can become large enough to diffract/scatter the incident light thereby making the substrate opaque.

Accordingly, by controlling the initial strain applied while forming the second material, apparatuses having desired transmittance at zero applied strain can be fabricated.

In certain embodiments, the switching of the orientation of the wrinkles by stretching around the initial pre-strain value can be repeated for many cycles.

In certain embodiments, as shown in FIGS. 8A through 8C, the wrinkles formed on the second material may be sinusoidal. The increase in the amplitude of the wrinkles around the initial pre-strain value can effectively increase the diffraction efficiency of the grating-like wrinkle pattern. Therefore, the transmittance of the substrate can decrease when the strain is either increased or decreased from the initial pre-strain value. This feature can impart mechano-optical sensitivity to the wrinkled substrate that detects external mechanical stress (either compressive or tensile) and transduces this signal to an optical response dynamically and reversibly.

Stretching Device

Numerous different stretching devices can be utilized. For example, simple manually operated mechanical stretchers can be utilized. In some embodiments, the mechanical stretchers can be remotely actuated or triggered by sensors or other types of smart materials. In some instances, the sensitivity of the substrate material, such as PDMS, to temperature can be utilized to adaptively control light transmission. In some instances, the composition of the substrate material can be modified to contain magnetic fillers to utilize external magnetic field as a mean to stretch the substrate material. In certain embodiments, pneumatic actuation can be utilized. For example, circular substrate material with a second material can be mounted on a circular frame to form a window and an air pressure can be applied to the window. Bulging of the window can provide the needed strain to change the transmittance of the window.

As used herein, a "stretching device" is meant to encompass a suitable nonhuman device that can be operably coupled to the substrate material having a second material to apply a desired amount of elongation thereon so that a shading system, such as a window shade or an area divider, can be fabricated and utilized.

Figure 9A:
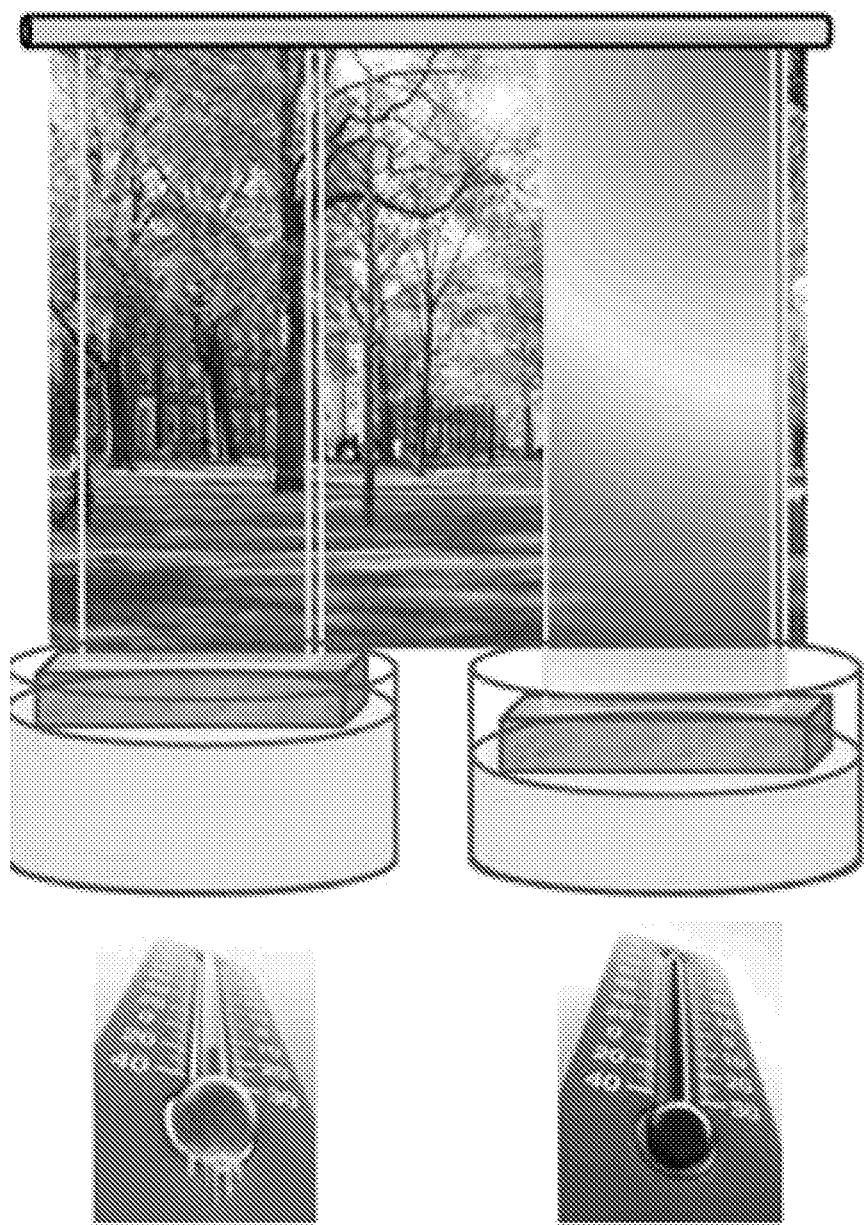
FIG. 9A is a schematic diagram of a PDMS sheet having a silica-like structure on a surface thereon connected to a weight floating on water to allow reversible transition between a transparent and an opaque/colored state in accordance with certain embodiments.

FIG. 9 illustrates a few design examples. For example, FIG. 9A shows the bottom of an elastomeric material sheet having a second material connected to a weight that is floating on water. By adjusting the water level (e.g., pumps, temperature change, humidity change), the weight can either apply or reduce strain applied to the elastomeric material sheet having the second material as the buoyancy force that counteracts the weight can be decreased or increased, respectively.

Figure 9B:
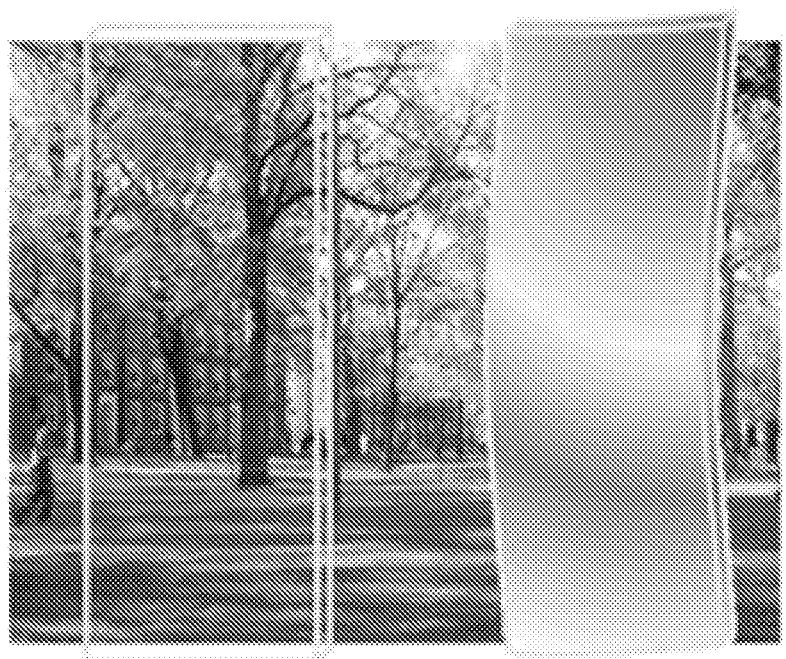
FIG. 9B is a schematic diagram of a PDMS sheet having a silica-like structure on a surface thereon on a bendable frame to allow reversible transition between a transparent and an opaque/colored state in accordance with certain embodiments.

In some other embodiments, as shown in FIG. 9B, the elastomeric material sheet having the second material can be coated on a flexible window. Mechanical bending of the window may allow stretching of the elastomeric material sheet having the second material to effectuate a change in transparency/color.

Figure 9C:
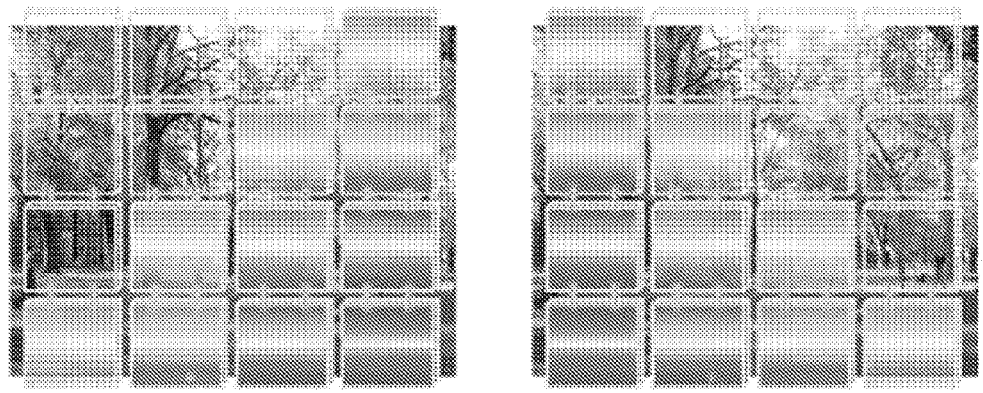
FIG. 9C is a schematic diagram of a mosaic of PDMS sheets having a silica-like structure on a surface thereon that can allow reversible transition between a transparent and an opaque/colored state in accordance with certain embodiments.

In yet another embodiment, FIG. 9C shows a mosaic of small area sheets of elastomeric material sheet having the thin layer of a second material that are constructed to cover a large area. Due to the weight of individual sheets hanging one after another, the color shading can form a gradient. The gradient can further change by application of outside forces such as wind, temperature, humidity, etc. The order and pattern of the stretching of mosaic sheets can be computerized to achieve aesthetic diversity of patterns and complex colors, if desired.

In yet some other embodiments, the stretching device may be coupled with a timer device where the applied strain changes as a function of time. When the elastomeric material having a plurality of different patterned regions of the second material are connected to such a stretching device, a plurality of messages depending on the applied strain may be fabricated. For example, at a first applied strain, a message indicating "Be back in 30 minutes" can be displayed. After 10 minutes, the stretching device may apply a second applied strain, whereupon a messaging indicating "Be back in 20 minutes" can be displayed. After 20 minutes, the stretching device may apply a third applied strain, whereupon a messaging indicating "Be back in 10 minutes" can be displayed. Upon release of the applied strain (e.g., either after 10 additional minutes or by manual input by a user), a message indicating "Welcome" can be displayed.

In certain embodiments, the stretching device may be the user. For example, the elastomeric material having the second material may be applied over a belt or suspender where it is initially transparent. When the user's waist size or body size increases, a message displaying "Exercise!" can be displayed. As another example, the elastomeric material having a second material may initially contain a patterned message displaying "Stretch me!" applied to, for example, a greeting card. When a user stretches the material, a hidden greeting card message may now be displayed on a second patterned region, such as "Happy Birthday!" whereas the initially displayed "Stretch me!" region turns transparent.

Other stretching devices suitable for the invention will be readily apparent to one of ordinary skill in the art. For example, the elastomeric material sheet having the thin layer of a second material can be either directly rolled onto a cylinder or attached to another material that is rolled onto a cylinder wherein one end of the sheet is affixed to one edge of the window and the cylinder is provided at a second edge of the window. The cylinder may be actuated with a worm gear and/or a motor that can rotate the cylinder to apply or reduce strain on the elastomeric material sheet having the thin layer of a second material. As the cylinder turns and strain is applied or reduced, the elastomeric material sheeting having the thin layer of a second material can switch from an opaque to a transparent state.

In certain embodiments, the stretching device may apply a uniaxial tension or uniaxial compression relative to an initial state. In some other embodiments, the stretching device may apply a two-dimensional tension or compression relative to an initial state. In some other embodiments, the stretching device may bend or twist to apply an even more complex form of applied strain. Other forms of applied strain that can be similarly used will be readily apparent to one of ordinary skill in the art.

EXAMPLE 1

PDMS Shading System

PDMS is one material that can be used in fabricating the shading system of the present disclosure. PDMS is a non-toxic and transparent elastomeric polymer that can be processed to a variety of shapes and architectures ranging from microfluidic channels to a building scale large sheets and coatings. PDMS sheets can be produced by mixing a desired combination of precursors and crosslinkers (e.g., DOW SYLGARD 182 or 184 kits) and curing the mixture in the form of a sheet. The mechanical properties of the resulting PDMS sheet can be adjusted by controlling the relative amounts of the precursor/crosslinker combination (e.g., Shore Hardness 50 A±20. The resulting PDMS sheet can be reversibly stretched and compressed because the resulting PDMS sheet is an elastomeric material.

When the surface of a PDMS sheet is oxidized, silica-like ($SiO_x$) structures can be formed on the surface of the PDMS sheet. First, a PDMS sheet can be oxidized using a suitable method, such as placing the PDMS sheet into a plasma oxidation chamber, UV-ozone chamber, using a handheld corona discharger, or using a chemical method, and the like to form a silica-like layer on a surface of the PDMS sheet. During the oxidation, the temperature can increase. After oxidation, as the temperature decreases, the different thermal expansion coefficient between the PDMS and the silica-like layer can lead to mechanical stress at the interfacial area that is greater than the critical buckling stress. The stress relaxation can induce buckling of the surface creating sub-micron sized structures, such as hills and valleys, or wrinkles, on the surface of the cooled-down PDMS sheet.

In some other embodiments, after oxidation, additional precursor and cross linkers of the PDMS sheet can be mixed, deposited on top of the oxidized layer, and cured. Accordingly, the second material can be embedded in the elastomeric material. Such an approach can allow the formation of layered structure having PDMS (i.e., hydrophobic surface) on both sides of the shading system.

When the PDMS containing the oxidized second material layer is stretched, the pitches and the amplitudes of the hills and valleys can be changed so that visible light is scattered more or less due to the changes in the diffraction efficiency of the wrinkled surfaces acting like a grating. As a result, the PDMS having the silica-like structures can become opaque and iridescent with various colors. When the stretching force is removed, the PDMS sheet can restore to its original (or near-original) length and the interference of visible light no longer occurs and again becomes transparent. The stretching and restoring of the shading system to its original length may be completely reversible and can be repeated for an unlimited number within the range of elastic deformation of the PDMS sheet.

While not wishing to be bound by theory, the surface patterns of hills and valleys can cause scattering of incident light upon stretching, rendering the shading system opaque. The interference between the scattered light with the hills and valleys can be perceived as various colors by human eyes (i.e. diffraction). Moreover, it may be possible that infrared radiation can be either absorbed by PDMS or scattered at the surface.

In another embodiment, the PDMS can be pre-stretched before oxidation. In this case, upon oxidation and release of the stretched state, the shading system can be opaque and have a colored surface. Upon application of the strain, the shading system can become transparent. Other embodiments will be readily apparent to one of ordinary skill in the art. For example, precise control of pre-stretching and the control of the pitch (or wavelength) and the amplitude in the wrinkled pattern can lead to a shading system that can selectively scatter ultraviolet radiation while transmitting visible light.

The shading system described herein exhibits further additional superior results over that of conventional systems. For example, because the shading system utilizes an elastomeric sheet, small punctures or scratches can be easily repaired. For example, the holes can be plugged with additional elastomeric precursors and allowed to cure without having to replace the entire shades like the conventional systems. In certain instances, the elastomeric sheets can "self-heal" where small punctures or scratches can be healed on its own due to the viscoelastic nature of the elastomeric sheets.

In certain instances, the shading system can be fabricated to impart certain desired properties on a surface of the shading system. For example, hydrophobic properties or superhydrophobic properties can be imparted on the surface of the shading system to prevent water droplet condensation and to facilitate self-cleaning thereon.

In certain embodiments, the shading system can be fabricated as foldable or portable windows, shades, and the like. For example, polyurethane exhibits low notch sensitivity where the sheets can be readily folded and unfolded without tearing or leaving undesired "crease" marks. Accordingly, the shading system of the present disclosure can be folded away for compact storage or transport and unfolded prior to installation and/or use.

The shading system described herein is expected to be applicable to a wide range of applications and is not limited solely to window treatment. For example, the shading system can be utilized as adaptive shade control and temperature control, which can alter the intensity of amount of light passing through, which is not limited to visible wavelengths, but can also be applicable to infrared and/or ultraviolet radiation.

EXAMPLE 2

Optimization of Transparency and Opaqueness

A two-part silicone elastomer (DOW Sylgard 184) was mixed in a 10:1 mass ratio of base to curing agent. A dual centrifuge mixer was used to create a uniform mixture of the two components and to keep an identical mixing condition for all samples. Once thoroughly mixed, the material was degassed in a vacuum chamber for a period of 30 minutes to remove any trapped air bubbles from the mixture. After degassing, a known amount of the mixture was poured into a flat, shallow polystyrene dish (30 cm×30 cm) to achieve a desired thickness and placed into an oven at 60° C. to cure over a period of 2 hours. Once cured, the elastomer sheet was peeled away from the dish.

The elastomer sheet was cut into various shapes and sizes, depending on the application. For the plasma treatment process, the sheets were kept to thicknesses ranging from 0.5-2.5 mm. Prior to plasma treating, the elastomeric samples were clamped into a uniaxial, screw-driven stretching device and then stretched to the desired pre-stretch state (0%, 10%, 20, and 30% longer than the sample length at rest). Once loaded, the stretched sample was placed into a plasma vacuum chamber. Using a roughing pump, the chamber was evacuated (2 minutes). Oxygen gas was introduced to the system at a flow rate of 10 sccm for 1 minute, at which point the gas was turned off and the vacuum pump was allowed to reduce the pressure in the system (30 seconds). A 40 kHz power source at 100 W was used to ionize the oxygen gas. The elastomer was placed at a distance of 6 cm from the electrode. Treatment times depended on a variety of parameters, especially distance from the plasma electrode and its operating power. For high optical contrast, a plasma generating period of 70 seconds was used. After the plasma treatment, the chamber was vented to atmospheric pressure and the strain was slowly released from the sample.

After oxygen plasma treatment, the 75 mm×25 mm rectangular samples were mounted back onto the stretching device. Optical characterizations were performed using a transmission geometry at normal incident angle. A tungsten lamp was coupled through a 400 μm diameter fiber-optic cable to an optical setup. The dispersed incident light from the optical fiber tip was collimated to approximately a 2 cm diameter circular beam which was collected and focused onto a second fiber optic cable connected to a spectrometer controlled by custom software to collect and process the optical signal. In the collimated beam path, an adjustable aperture was used to control the illuminated area on the sample. Transmittance spectra were collected for each sample under incremental values of uniaxial strain from the wavelength range of 400 to 900 nm for a 25 ms integration period. The background spectrum was collected without turning on the light source and all the spectra collected were normalized by a spectrum collected without placing a sample in the beam path.

Figure 10:
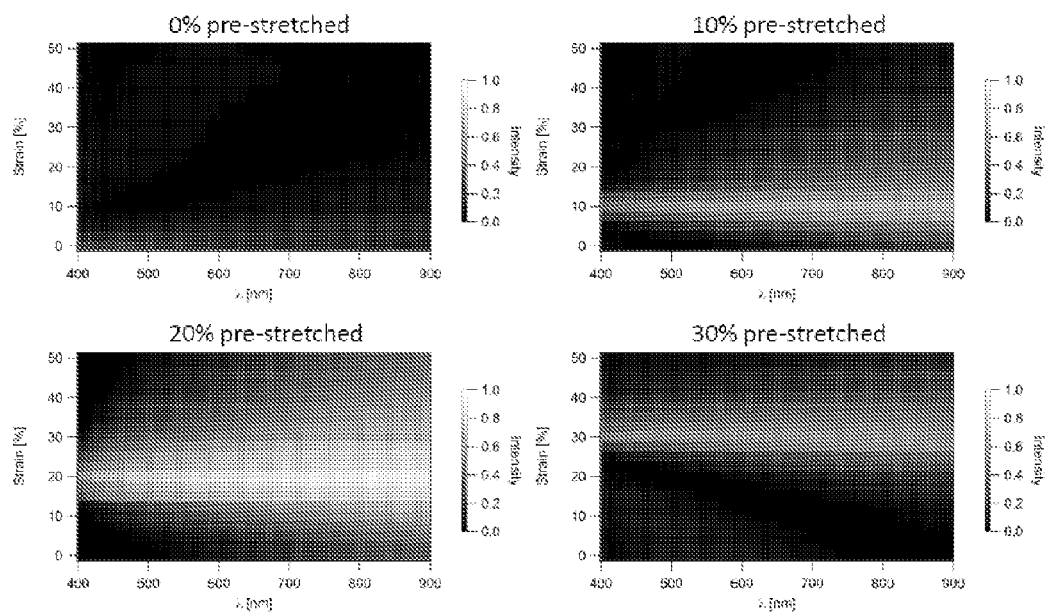
FIG. 10 shows a transmittance spectra of different PDMS sheets having a silica-like structure on a surface thereon that were prepared by applying 0%, 10%, 20%, and 30% pre-stretched strain when forming the silica-like structure as a function of applied strain in accordance with certain embodiments.

FIG. 10 shows the transmittance spectra for the various samples. As can be seen, transmittance for each sample is highest near the pre-stretched strain. However, among the samples, the sample prepared by 20% pre-stretch strain shows the highest transmittance when comparing the highest transmittance values for each sample. For example, the maximum transmittance at 20% strain for the 20% pre-stretched sample is about 93%, the maximum transmittance at 10% strain for the 10% pre-stretched samples is about 69%, and the maximum transmittance at 30% strain for the 30% pre-stretched samples is about 58%.

EXAMPLE 3

Microstructure Development

Figure 11A:
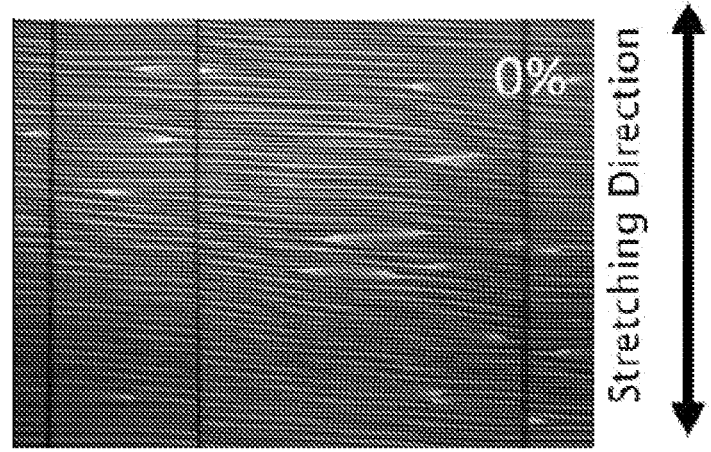
FIGS. 11A-11E show optical microscope images showing the evolution of wrinkles' microstructure of the second material prepared with 10% pre-stretched strain as a function of applied strain in accordance with certain embodiments.
Figure 11B:
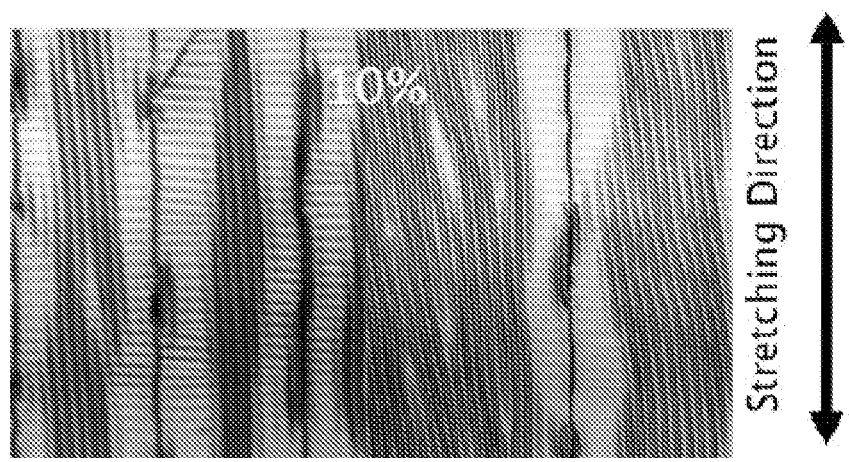
Figure 11C:
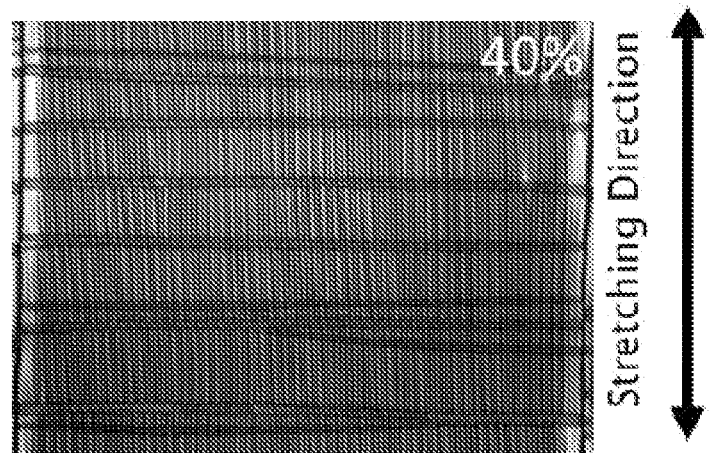
Figure 11D:
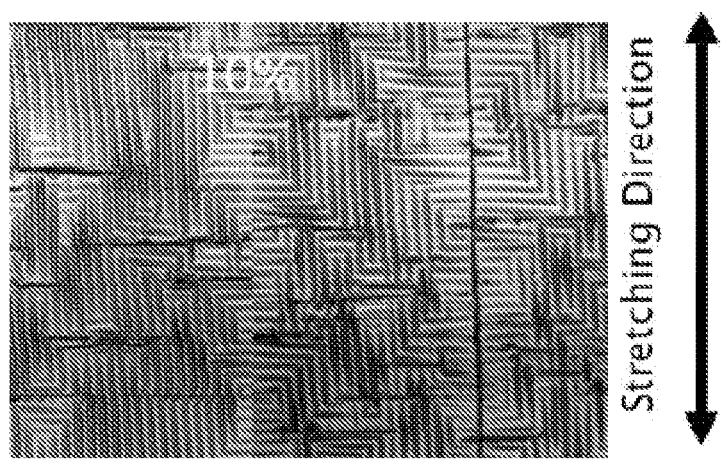
Figure 11E:
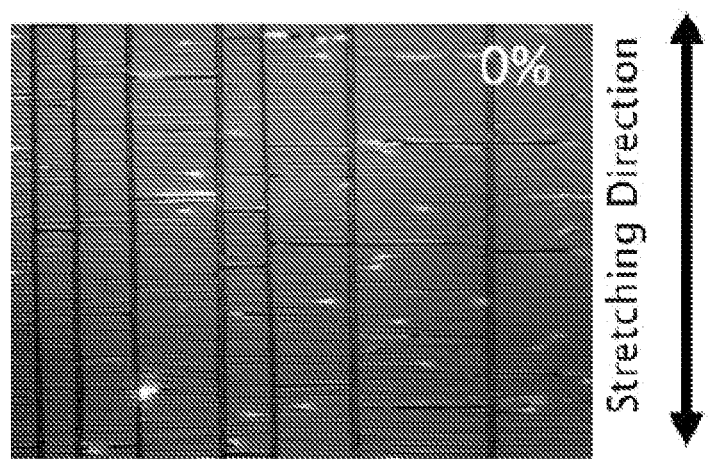

Sample prepared in accordance to Example 2 for the 10% pre-stretched strain was analyzed under optical microscope to analyze the microstructure that develops as a function of strain. As shown in FIG. 11A, at 0% applied strain (opaque), the wrinkles are predominantly oriented perpendicular to the stretching direction. As shown in FIG. 11B, at about 10% applied strain (transparent), the wrinkles are oriented both parallel and perpendicular to the stretching direction. As shown in FIG. 11C, at about 40% strain (opaque), the wrinkles are oriented parallel to the stretching direction. As shown in FIG. 11D, when the strain is relaxed back to 10% (transparent again), the wrinkles are again oriented both parallel and perpendicular to the stretching direction. Then, as shown in FIG. 11E, when the strain is relaxed back to 0% (opaque again), the wrinkles are again oriented perpendicular to the stretching direction.

Figure 12A:
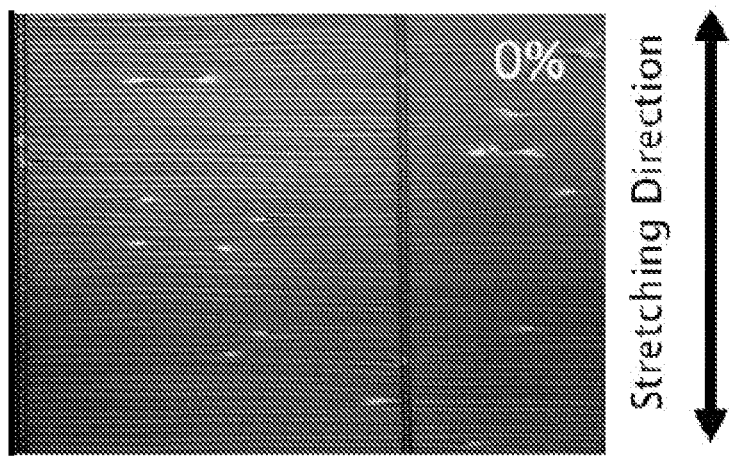
FIGS. 12A-12E show optical microscope images showing the evolution of wrinkles' microstructure of the second material prepared with 20% pre-stretched strain as a function of applied strain in accordance with certain embodiments.
Figure 12B:
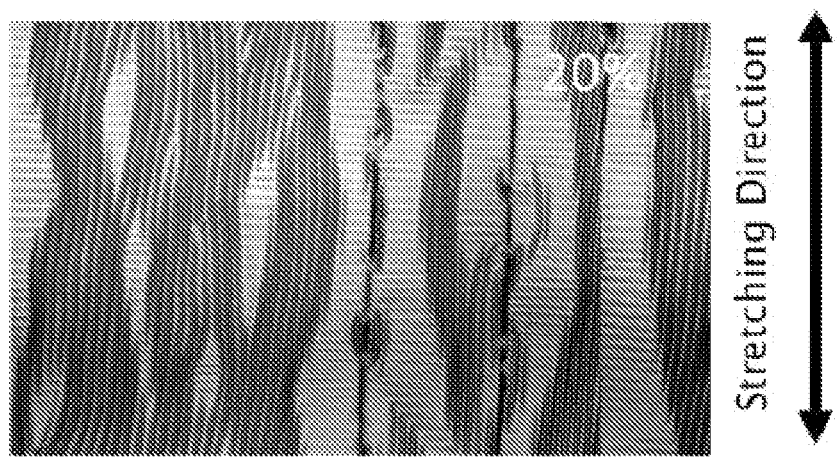
Figure 12C:
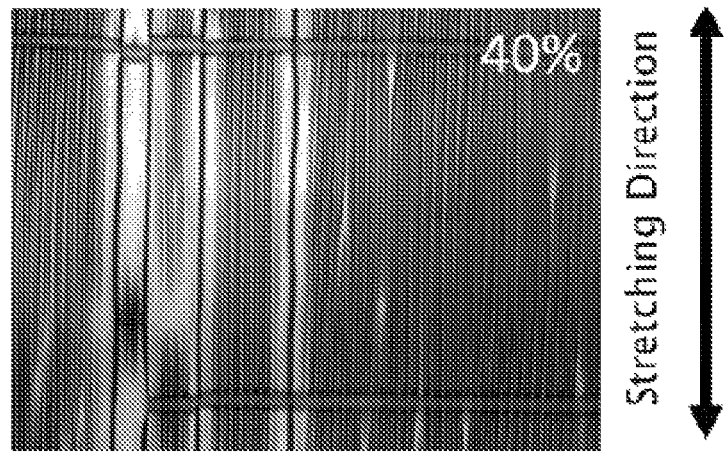
Figure 12D:
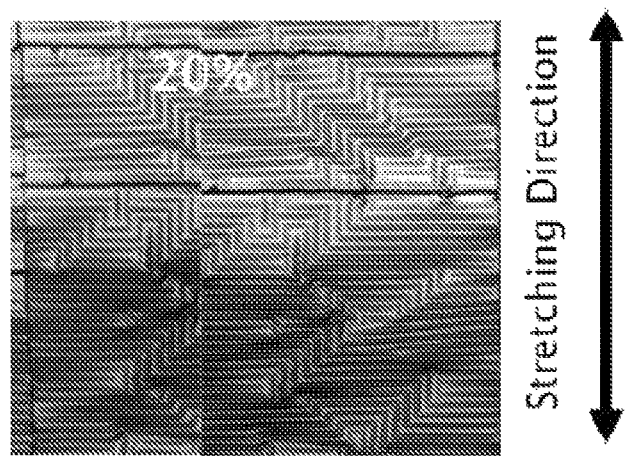
Figure 12E:
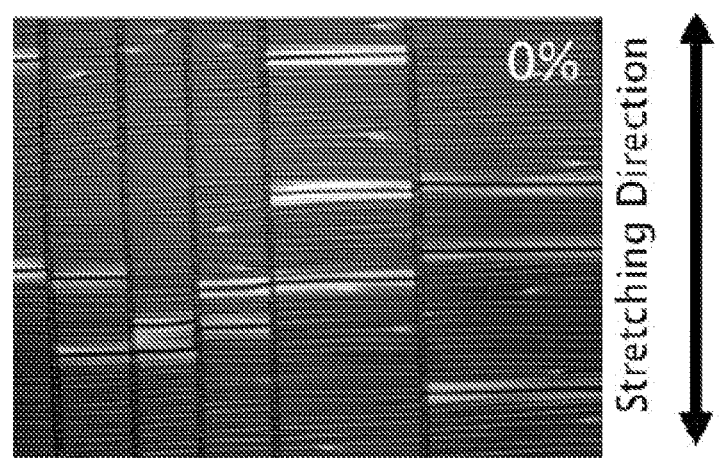

Sample prepared in accordance to Example 2 for the 20% pre-stretched strain was analyzed under optical microscope to analyze the microstructure that develops as a function of strain. As shown in FIG. 12A, at 0% applied strain (opaque), the wrinkles are predominantly oriented perpendicular to the stretching direction. As shown in FIG. 12B, at about 20% applied strain (transparent), the wrinkles are oriented both parallel and perpendicular to the stretching direction. As shown in FIG. 12C, at about 40% strain (opaque), the wrinkles are oriented parallel to the stretching direction. As shown in FIG. 12D, when the strain is relaxed back to 20% (transparent again), the wrinkles are again oriented both parallel and perpendicular to the stretching direction. Then, as shown in FIG. 12E, when the strain is relaxed back to 0% (opaque again), the wrinkles are again oriented perpendicular to the stretching direction.

Figure 13A:
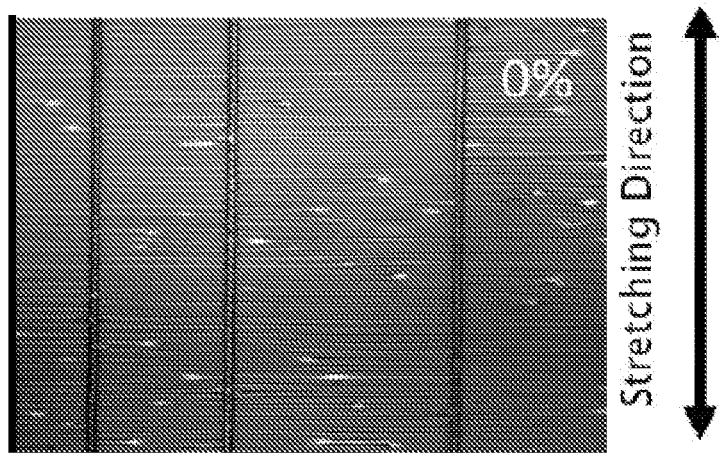
FIGS. 13A-13E show optical microscope images showing the evolution of wrinkles' microstructure of the second material prepared with 30% pre-stretched strain as a function of applied strain in accordance with certain embodiments.
Figure 13B:
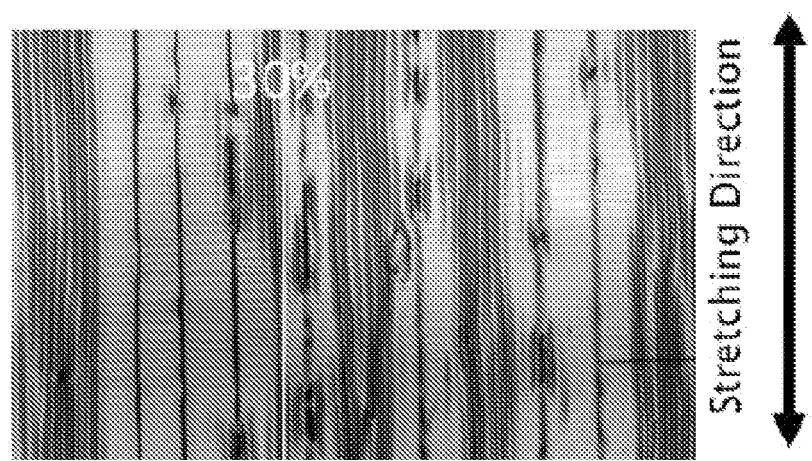
Figure 13C:
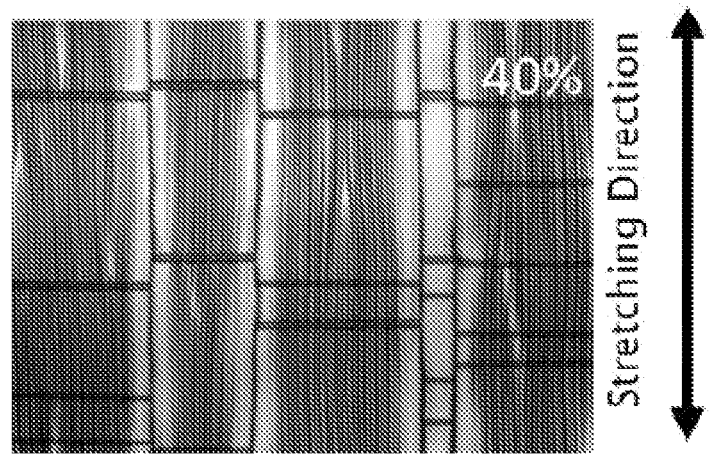
Figure 13D:
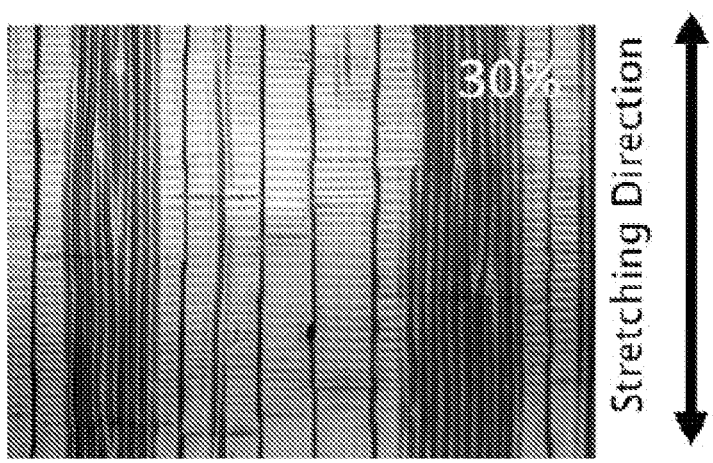
Figure 13E:
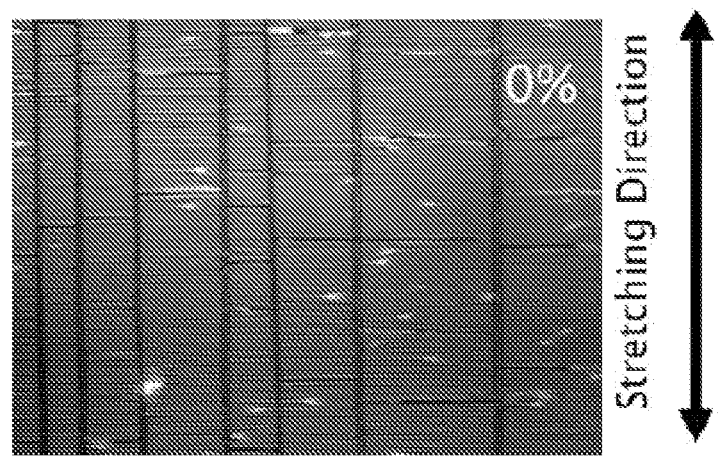

Sample prepared in accordance to Example 2 for the 30% pre-stretched strain was analyzed under optical microscope to analyze the microstructure that develops as a function of strain. As shown in FIG. 13A, at 0% applied strain (opaque), the wrinkles are predominantly oriented perpendicular to the stretching direction. As shown in FIG. 13B, at about 30% applied strain (transparent), the wrinkles are oriented both parallel and perpendicular to the stretching direction. As shown in FIG. 13C, at about 40% strain (opaque), the wrinkles are oriented parallel to the stretching direction. As shown in FIG. 13D, when the strain is relaxed back to 30% (transparent again), the wrinkles are again oriented both parallel and perpendicular to the stretching direction. Then, as shown in FIG. 13E, when the strain is relaxed back to 0% (opaque again), the wrinkles are again oriented perpendicular to the stretching direction.

EXAMPLE 4

Privacy Screens

Figure 14:
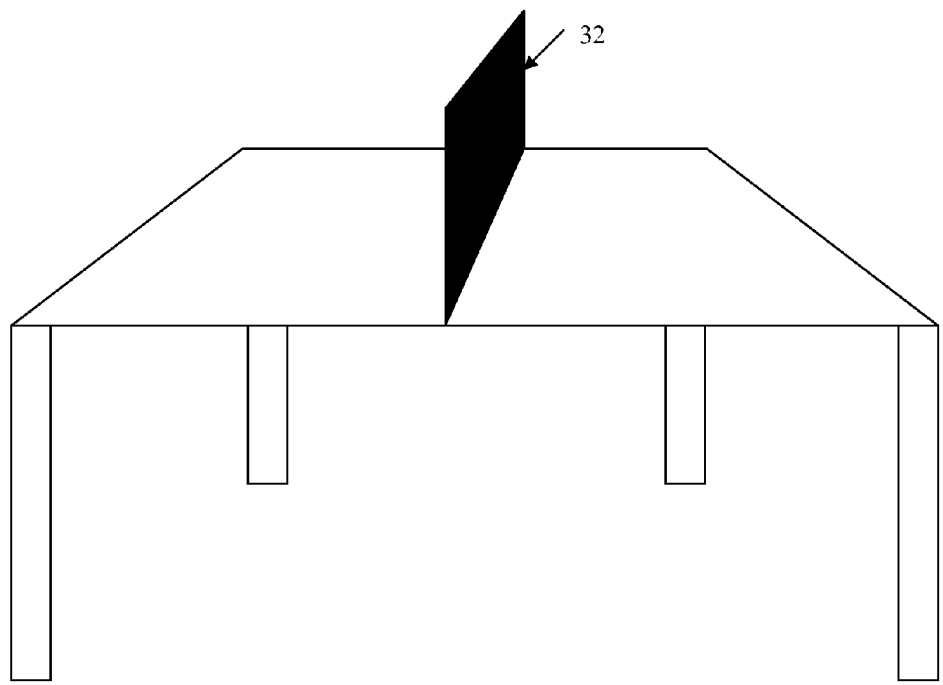
FIG. 14 is a schematic diagram of a desk having a shading system so that privacy between two different desk users can be maintained or removed in accordance with certain embodiments.

The present disclosure is also applicable to any areas where privacy control is desired, such as room dividers or office desk privacy screens that can quickly and reversibly transition between a transparent and an opaque state. FIG. 14 shows a double desk with a free-standing stretchable screen 32, which can be removed when needed to produce a single desk. Such shades, dividers and privacy screens can be either installed in place or be modular, movable pieces that can be easily moved to a desired location. In contrast, other existing room dividers or office desk privacy screens require much physical labor and set up time to install and use.

In some other instances, the privacy screens can be utilized as mood setting material, where color can change at different viewing angles and under different environmental conditions.

The privacy screens can also be utilized in artistic displays where non-uniform stretching modes can produce complex patterns by selectively stretching and releasing certain areas of the sheet.

EXAMPLE 5

Signs and Displays

In certain embodiments, the present disclosure is also applicable to signs that display desired messages, such as an advertisement sign, business sign, encrypted or hidden messages, greeting cards, business cards, "smart" displays that display different messages depending on the applied strain, and the like.

For example, a display may initially show the message "Stretch Me" as shown in FIG. 6C, where only one end of the display is fixed. When a user stretches the display, a new message, such as "Harvard" (as shown in FIG. 6D) or any other desired message, can be shown. Such displays can be incorporated into greeting cards that initially show "Stretch Me" and later shows "Happy Birthday!" and the like when the reader actually stretches the display. Numerous other embodiments can be envisioned by one of ordinary skill in the art.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A shading system comprising:
   a substrate;
   a second material having a different index of refraction than the substrate on or embedded within a region of the substrate and forming a plurality of wrinkles; and
   a stretching device to reversibly stretch the substrate and the second material and to reduce the applied elongation;
   wherein the stretching device is capable of controlling the amount of light transmission by altering the orientation of the wrinkles as a function of applied strain;
   wherein the shading system is transparent when some of the wrinkles are oriented substantially parallel to the stretching direction and some of the wrinkles are oriented substantially perpendicular to the applied strain direction,
   wherein the stretching device applies strain and reduces the applied strain based on one or more environmental changes, pneumatic actuation, applied magnetic field, or applied electric field,
   wherein the one or more environmental changes include a change in temperature, humidity, or intensity of light.

2. The shading system of claim 1, wherein
   increasing the applied strain reduces light transmission through the shading system, and the reduction of the applied strain increases light transmission through the shading system.

3. The shading system of claim 1, wherein
   increasing the applied strain increases light transmission through the shading system, and the reduction of the applied strain reduces light transmission through the shading system.

4. The shading system of claim 1, wherein the substrate comprises polydimethylsiloxane or polyurethane.

5. The shading system of claim 1, wherein the second material comprises oxidized regions of the substrate.

6. A shading system comprising:
   a substrate;
   a second material having a different index of refraction than the substrate on or embedded within a region of the substrate and forming a plurality of wrinkles; and
   a stretching device to reversibly stretch the substrate and the second material and to reduce the applied elongation;
   wherein the stretching device is capable of controlling the amount of light transmission by altering the orientation of the wrinkles as a function of applied strain;
   wherein the shading system is transparent when some of the wrinkles are oriented substantially parallel to the stretching direction and some of the wrinkles are oriented substantially perpendicular to the applied strain direction,
   wherein the shading system becomes opaque by forming the wrinkles to be oriented substantially parallel to the direction of the applied strain.

7. The shading system of claim 1, wherein the substrate comprises polydimethylsiloxane and the second material comprises SiOx.

8. A display comprising:
   a substrate; and
   a first region on or embedded within the substrate that comprises a second material having a different index of refraction than the substrate and forming a plurality of wrinkles;
   wherein the display is capable of controlling the amount of light transmission through the first region to exhibit a desired message by altering the orientation of the plurality of wrinkles as a function of applied strain;
   wherein the first region of the display is transparent when some of the wrinkles are oriented substantially parallel to the stretching direction and some of the wrinkles are oriented substantially perpendicular to the applied strain direction, and
   a stretching device to reversibly stretch the substrate and the second material and to reduce the applied elongation,
   wherein the stretching device applies strain and reduces the applied strain based on one or more environmental changes, pneumatic actuation, applied magnetic field, or applied electric field,
   wherein the one or more environmental changes include a change in temperature, humidity, or intensity of light.

9. The display of claim 8, wherein
   increasing the applied strain increases light transmission through the first region, and the reduction of the applied strain reduces light transmission through the first region.

10. The display of claim 9, further comprising:
    a second region comprising the same or different second material having a different index of refraction than the substrate;
    wherein increasing the applied strain decreases light transmission through the second region, and the reduction of the applied strain increases light transmission through the second region.

11. The display of claim 8, wherein
    increasing the applied strain decreases light transmission through the first region, and the reduction of the applied strain increases light transmission through the first region.

12. The display of claim 11, further comprising:
    a second region comprising the same or different second material having a different index of refraction than the substrate;
    wherein increasing the applied strain increases light transmission through the second region, and the reduction of the applied strain increases light transmission through the second region.

13. The display of claim 8, wherein the substrate comprises polydimethylsiloxane or polyurethane.

14. The display of claim 8, wherein the second material comprises oxidized regions of the substrate.

15. A display comprising:
a substrate; and
a first region on or embedded within the substrate that comprises a second material having a different index of refraction than the substrate and forming a plurality of wrinkles;
wherein the display is capable of controlling the amount of light transmission through the first region to exhibit a desired message by altering the orientation of the plurality of wrinkles as a function of applied strain;
wherein the first region of the display is transparent when some of the wrinkles are oriented substantially parallel to the stretching direction and some of the wrinkles are oriented substantially perpendicular to the applied strain direction,
wherein the first region becomes opaque by forming the wrinkles to be oriented substantially parallel to the direction of the applied strain.

16. The display of claim 8, wherein the substrate comprises polydimethylsiloxane and the second material comprises SiOx.

17. A method comprising:
providing a substrate;
forming a second material on or embedded within a region of the substrate and forming a plurality of wrinkles, wherein the second material has a different index of refraction than the substrate; and
operably providing the substrate and the second material to a stretching device to form a shading system so that the stretching device is capable of stretching the shading system and the stretching device is capable of reducing the applied strain, and the stretching device is capable of controlling the amount of light transmission altering the orientation of the wrinkles as a function of applied strain;
wherein the shading system is transparent when some of the wrinkles are oriented substantially parallel to the stretching direction and some of the wrinkles are oriented substantially perpendicular to the applied strain direction,
wherein the stretching device is operably configured to apply strain and reduced the applied strain based on one or more environmental changes, pneumatic actuation, applied magnetic field, or applied electric field,
wherein the one or more environmental changes include a change in temperature, humidity, or intensity of light.

18. The method of claim 17, further comprising:
stretching the substrate and the second material to reduce light transmission through the shading system.

19. The method of claim 18, further comprising:
reducing the applied strain to increase light transmission through the shading system.

20. The method of claim 17, further comprising:
stretching the substrate and the second material to increase light transmission through the shading system.

21. The method of claim 20, further comprising:
reducing the applied strain to reduce light transmission through the shading system.

22. The method of claim 17, wherein the substrate comprises polydimethylsiloxane (PDMS) or polyurethane.

23. The method of claim 17, wherein said forming a second material comprises oxidizing regions of the substrate to obtain the second material.

24. The method of claim 17, wherein said forming a second material results in a sheet having wrinkles oriented substantially perpendicular to the direction of the applied strain.

25. The method of claim 17, wherein the substrate comprises polydimethylsiloxane and the second material comprises SiOx.

26. The method of claim 17, wherein the stretching device is operably configured to apply strain and reduced the applied strain based on one or more environmental changes, pneumatic actuation, applied magnetic field, or applied electric field.

27. A method comprising:
providing a substrate;
forming a first region on or embedded within the substrate that comprises a second material having a different index of refraction than the substrate and having a plurality of wrinkles to form a display; and
operably providing a stretching device to reversibly stretch the substrate and the second material and to reduce the applied strain;
wherein the display is capable of controlling the amount of light transmission through the first region to exhibit a desired message by altering the orientation of the plurality of wrinkles as a function of applied strain;
wherein the first region of the display is transparent when some of the wrinkles are oriented substantially parallel to the stretching direction and some of the wrinkles are oriented substantially perpendicular to the applied strain direction,
wherein the stretching device applies strain and reduces the applied strain based on one or more environmental changes, pneumatic actuation, applied magnetic field, or applied electric field,
wherein the one or more environmental changes include a change in temperature, humidity, or intensity of light.

28. The method of claim 27, wherein
increasing the elongation increases light transmission through the first region, and reducing the applied strain reduces light transmission through the first region.

29. The method of claim 28, further comprising:
forming a second region comprising the same or different second material having a different index of refraction than the substrate;
wherein increasing the applied strain decreases light transmission through the second region, and
reducing the applied strain increases light transmission through the second region.

30. The method of claim 27, wherein
increasing the applied strain decreases light transmission through the first region, and
reducing the applied strain increases light transmission through the first region.

31. The method of claim 30, further comprising:
forming a second region comprising the same or different second material having a different index of refraction than the substrate;
wherein increasing the applied strain increase light transmission through the second region, and
reducing the applied strain increases light transmission through the second region.

32. The method of claim 27, wherein the substrate comprises polydimethylsiloxane or polyurethane.

33. The method of claim 27, wherein the second material comprises oxidized regions of the substrate.

34. The method of claim 27, wherein said forming a second material has wrinkles oriented substantially perpendicular to the direction of the applied strain.

35. The method of claim 27, wherein the substrate comprises polydimethylsiloxane and the second material comprises SiOx.

\* \* \* \* \*